US012704488B2

(12) United States Patent
Sugiyama et al.

(10) Patent No.: US 12,704,488 B2
(45) Date of Patent: Aug. 11, 2026

(54) MASS SPECTROMETRY SYSTEM, PROCESSING DEVICE, AND ANOMALY DETECTION METHOD

(71) Applicant: HITACHI HIGH-TECH CORPORATION, Tokyo (JP)

(72) Inventors: Masuyuki Sugiyama, Tokyo (JP); Hideki Hasegawa, Tokyo (JP); Yuichiro Hashimoto, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 285 days.

(21) Appl. No.: 18/576,783

(22) PCT Filed: Jun. 29, 2022

(86) PCT No.: PCT/JP2022/026068
§ 371 (c)(1),
(2) Date: Jan. 5, 2024

(87) PCT Pub. No.: WO2023/286612
PCT Pub. Date: Jan. 19, 2023

(65) Prior Publication Data

US 2024/0310338 A1 Sep. 19, 2024

(30) Foreign Application Priority Data

Jul. 12, 2021 (JP) ................................ 2021-115280

(51) Int. Cl.
*G01N 30/86* (2006.01)
*G01N 30/72* (2006.01)
*G01N 30/02* (2006.01)

(52) U.S. Cl.
CPC ......... *G01N 30/86* (2013.01); *G01N 30/7233* (2013.01); *G01N 2030/027* (2013.01)

(58) Field of Classification Search
CPC ............... G01N 30/86; G01N 30/7233; G01N 2030/027; G01N 30/466; G01N 30/88; H01J 49/04; H01J 49/0027
See application file for complete search history.

(56) References Cited

U.S. PATENT DOCUMENTS 6,908,740 B2 6/2005 Vandekerckhove et al.
2004/0005633 A1 1/2004 Vandekerckhove et al.
2022/0050091 A1 * 2/2022 Sugiyama .......... G01N 30/8658

FOREIGN PATENT DOCUMENTS

JP 11-304783 A 11/1999
JP 2002-340876 A 11/2002
(Continued)

OTHER PUBLICATIONS

International Search Report of PCT/JP2022/026068 dated Aug. 30, 2022.
(Continued)

*Primary Examiner* — Xin Y Zhong
(74) *Attorney, Agent, or Firm* — MATTINGLY & MALUR, PC

(57) ABSTRACT

In order to easily detect anomaly in a liquid chromatograph mass spectrometer, a liquid chromatography including a plurality of flow paths, a mass spectrometer, and a processing device that acquires a signal intensity that is a measurement result of a substance from the mass spectrometer are provided, each of the plurality of flow paths includes a separation column, the plurality of flow paths is installed to be parallel to each other, a flow path connected to the mass spectrometer is selected from the plurality of flow paths by a selector valve, a predetermined substance is made to flow together with a solution in each of the plurality of flow paths and the mass spectrometer measures the predetermined substance, and the processing device determines an anomaly
(Continued)

of LC/MS based on the signal intensity obtained by the mass spectrometer for each of the plurality of flow paths, and outputs a result.

13 Claims, 13 Drawing Sheets

(56) References Cited

FOREIGN PATENT DOCUMENTS

| | | | | |
|---|---|---|---|---|
| JP | 2005-500990 | A | 1/2005 | |
| WO | WO-2020121660 | A1 * | 6/2020 | ........... G01N 27/623 |

OTHER PUBLICATIONS

Written Opinion of the International Search Authority of PCT/JP2022/026068 dated Aug. 30, 2022.

* cited by examiner

Start
MEASUREMENT OF STANDARD SAMPLE
S201
LARGER THAN THRESHOLD IN ALL FLOW PATHS?
S202
Yes
No
LESS THAN OR EQUAL TO THRESHOLD IN ALL FLOW PATHS?
S211
Yes
No
DETERMINE THAT THERE IS NO CONTAMINATION, AND OUTPUT
S203
DETERMINE THAT SPECIFIC FLOW PATH IS CONTAMINATED, AND OUTPUT
S212
DETERMINE THAT ANY ONE OF COMMON PART, SOLUTION, AND ION SOURCE IS CONTAMINATED, AND OUTPUT
S213
End

FIG. 6

| | LOW SIGNAL INTENSITY IN ALL FLOW PATHS | LOW SIGNAL INTENSITY ONLY IN SPECIFIC FLOW PATH |
|---|---|---|
| CONTAMINATION OF ANY ONE OF COMMON PART, SOLUTION, AND MASS SPECTROMETER | ○ | |
| CONTAMINATION OF FLOW PATH | | ○ |

Start
MEASUREMENT OF STANDARD SAMPLE
S401
W11 ESTABLISHED?
S402
Yes
No
WHICH OF W21 AND W22 IS ESTABLISHED?
S411
W21
W22
WHICH OF W31 AND W32 IS ESTABLISHED?
S412
W31
W32
W41 ESTABLISHED?
S421
Yes
No
CONTAMINATION OF COMMON PART OR SOLUTION
S413
CONTAMINATION OF SOLUTION
S414
CONTAMINATION OF SPECIFIC FLOW PATH
S415
CONTAMINATION OR DETERIORATION OF MASS SPECTROMETER
S422
NO ANOMALY
S423
OUTPUT
S431
End

FIG. 10A
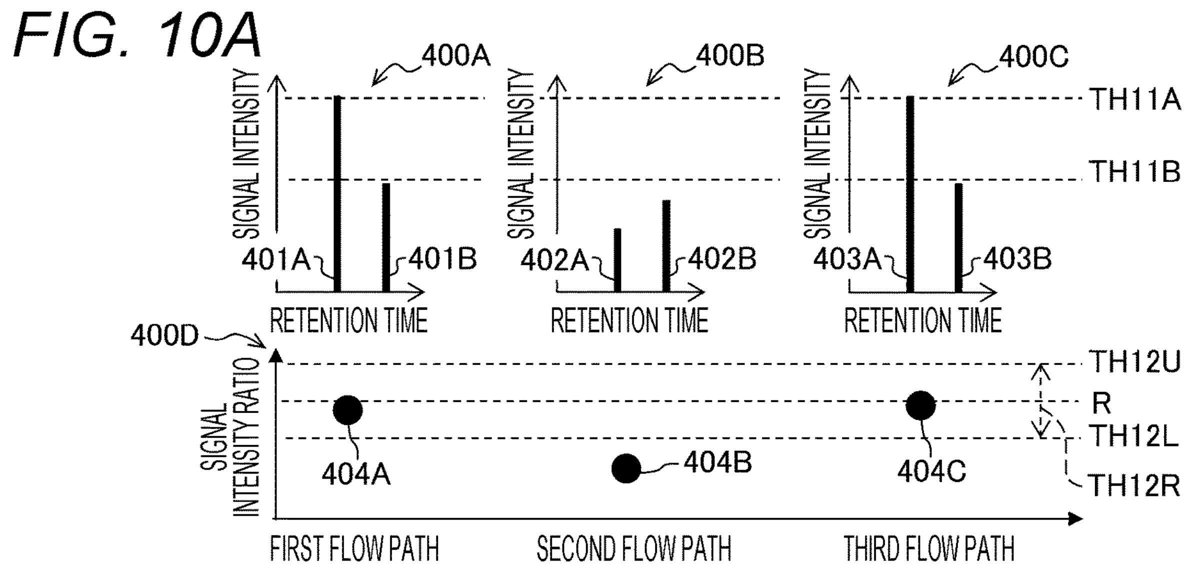
FIG. 10B
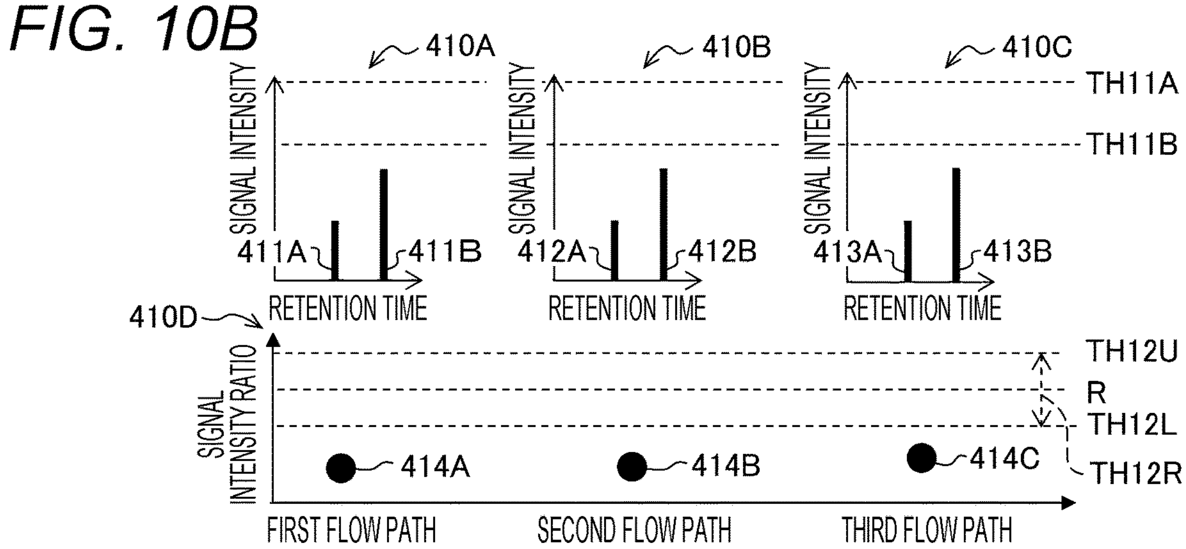
FIG. 10C
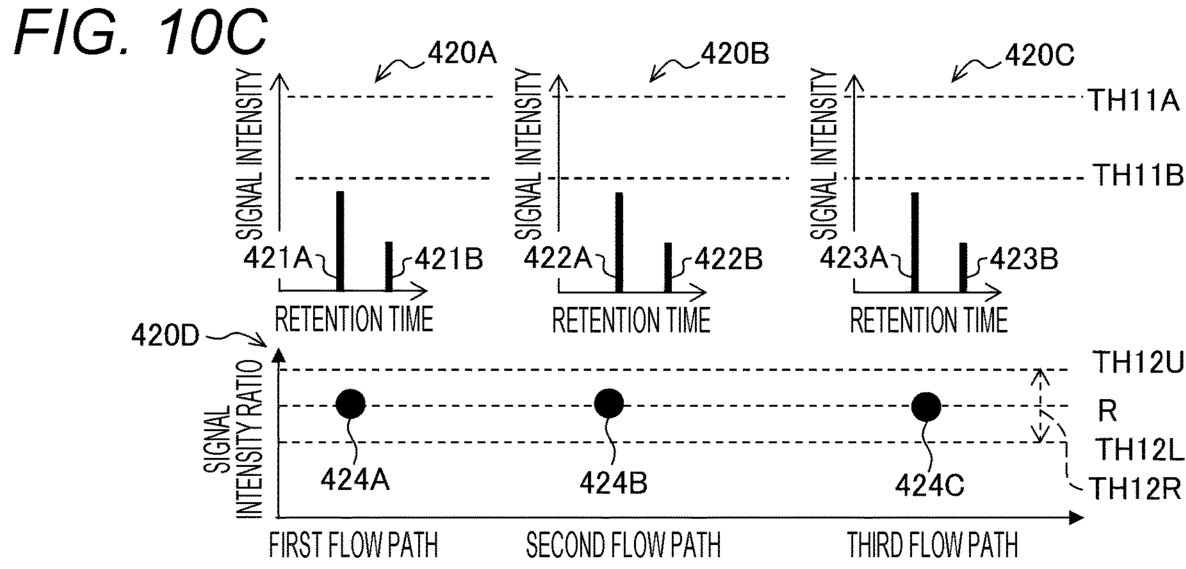

FIG. 12

| SIGNAL INTENSITY RATIO | OUT OF SIGNAL INTENSITY RATIO THRESHOLD RANGE IN ANY ONE OF FLOW PATHS (W11: Yes) | | | WITHIN SIGNAL INTENSITY RATIO THRESHOLD RANGE IN ALL FLOW PATHS (W11: No) | |
|---|---|---|---|---|---|
| SIGNAL INTENSITY AND SIGNAL INTENSITY RATIO | LOW SIGNAL INTENSITY AND OUT OF SIGNAL INTENSITY RATIO THRESHOLD RANGE IN ALL FLOW PATHS (W21) | | LOW SIGNAL INTENSITY AND OUT OF SIGNAL INTENSITY RATIO THRESHOLD RANGE IN SPECIFIC FLOW PATH (W22) | LOW SIGNAL INTENSITY IN ALL FLOW PATHS (W41) | LOW SIGNAL INTENSITY IN SPECIFIC FLOW PATH |
| | COMPONENT HAVING LOW IONIZATION EFFICIENCY HAS LARGE DECREASE WIDTH IN X, AND LOW X/X0 (W31) | COMPONENT HAVING HIGH IONIZATION EFFICIENCY HAS LARGE DECREASE WIDTH IN X, AND LOW X/X0 (W32) | | | |
| CONTAMINATION OR DETERIORATION OF MASS SPECTROMETER | | | | ○ | |
| CONTAMINATION OF COMMON PART | ○ | | | | |
| CONTAMINATION OF SOLUTION | △ | ○ | | | |
| CONTAMINATION OF SPECIFIC FLOW PATH | | | ○ | | |

MASS SPECTROMETRY SYSTEM, PROCESSING DEVICE, AND ANOMALY DETECTION METHOD

TECHNICAL FIELD

The present invention relates to a technique of a mass spectrometry system, a processing device, and an anomaly detection method in a liquid chromatograph mass spectrometer (LC/MS) having a plurality of flow paths passing through a separation column.

BACKGROUND ART

A mass spectrometer is a device that separates ions by a mass-to-charge ratio (m/z) of molecular ions in vacuum. Then according to the mass spectrometer, it is possible to separate and detect ions with high sensitivity and high accuracy. Furthermore, the mass spectrometer is generally used as a detector of a liquid chromatograph (LC), and an analysis method called liquid chromatography mass spectrometry (LC/MS) is often used.

Here, the LC is an analysis method in which a mobile phase is pressurized by a liquid feeding pump to pass through a separation column, and a sample is separated and detected by a difference in interaction (adsorption, distribution, etc.) with a stationary phase and a mobile phase of the separation column. In the analysis using the separation column, the higher a flow rate flowing through the separation column, the shorter a time required for separation. On the other hand, since the required liquid feeding pressure increases as the flow rate flowing through the separation column increases, it is necessary to apply a high pressure by the liquid feeding pump. Furthermore, in the case of the LC/MS, the higher the flow rate, the lower the ionization efficiency. Therefore, the throughput is limited in the LC analysis using a single flow path. Therefore, PTL 1 discloses a method for achieving a high throughput by performing analysis in parallel in a plurality of flow paths each having a separation column.

CITATION LIST

Patent Literature

PTL 1: U.S. Pat. No. 6,908,740

SUMMARY OF INVENTION

Technical Problem

In the LC/MS having the plurality of flow paths as in the technique described in PTL 1, there is a problem that it is difficult to identify a contaminated site because there are a plurality of factors of sensitivity decrease, such as contamination of a mobile phase, an ion source, and a flow path, and an error in solution mixing in a liquid feeding pump. Although it is necessary to identify the cause of such sensitivity decrease, PTL 1 does not disclose a method of identifying a contaminated site.

The present invention has been made in view of such a background, and an object of the present invention is to easily detect an anomaly in a liquid chromatograph mass spectrometer.

Solution to Problem

In order to solve the above problems, the present invention includes: a liquid chromatography including a plurality of flow paths; a mass spectrometer; and a processing device that acquires a signal intensity that is a measurement result of a substance from the mass spectrometer, in which each of the plurality of flow paths is provided with a separation column and the plurality of flow paths is installed so as to be parallel to each other, a flow path connected to the mass spectrometer is selected from the plurality of flow paths by a selector valve, a predetermined substance is made to flow together with a solution in each of the plurality of flow paths and the mass spectrometer measures the predetermined substance, and the processing device determines anomaly of the liquid chromatography and the mass spectrometer based on the signal intensity obtained as a result of measurement by the mass spectrometer for each of the plurality of flow paths, and outputs a result of determination to an output unit.

Other solutions will be appropriately described in the embodiments.

Advantageous Effects of Invention

According to the present invention, anomaly detection in the liquid chromatograph mass spectrometer can be easily performed.

BRIEF DESCRIPTION OF DRAWINGS

FIG. 6 is a table showing a summary of the first embodiment.

FIG. 10A is a diagram (part 1) illustrating a signal intensity and a signal intensity ratio of a standard sample measured for each flow path.

FIG. 10B is a diagram (part 2) illustrating the signal intensity and the signal intensity ratio of the standard sample measured for each flow path.

FIG. 10C is a diagram (part 3) illustrating the signal intensity and the signal intensity ratio of the standard sample measured for each flow path.

FIG. 12 is a table showing a summary of a third embodiment.

DESCRIPTION OF EMBODIMENTS

Next, modes for carrying out the present invention (referred to as "embodiments") will be described in detail with reference to the drawings as appropriate.

First Embodiment

First, a first embodiment will be described with reference to FIGS. 1 to 6.

(System Configuration)

Figure 1:
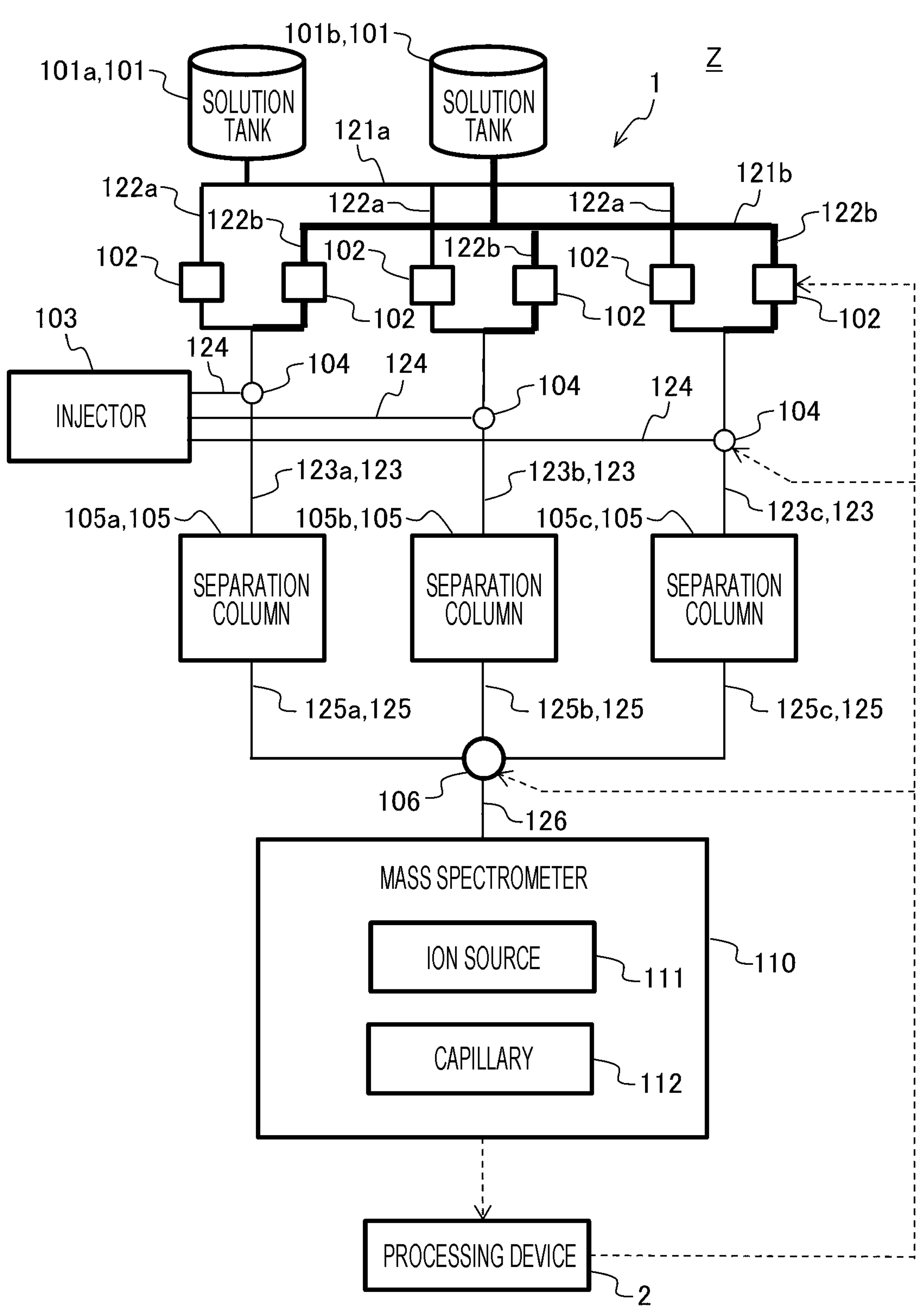
FIG. 1 is a diagram illustrating a configuration example of an LC/MC system.

FIG. 1 is a diagram illustrating a configuration example of an LC/MC system Z.

The LC/MC system Z includes an LC/MS (liquid chromatograph mass spectrometer) 1 and a processing device 2.

The LC/MS 1 includes a plurality of solution tanks 101, a plurality of liquid feeding pumps 102, an injector 103, a plurality of injection valves 104, a plurality of separation columns 105, a selector valve 106, and a mass spectrometer 110. Each configuration in the LC/MS 1 will be described later.

Moreover, the processing device 2 acquires a result of analyzing a sample from the mass spectrometer 110, and further controls switching of the liquid feeding pumps 102, the injection valves 104, and the selector valve 106. Note that, in order to make the drawing easy to see in FIG. 1, the processing device 2 is connected to one of the liquid feeding pumps 102 and one of the injection valves 104, but actually controls all the liquid feeding pumps 102 and all the injection valves 104.

Different types of solutions are stored in the respective solution tanks 101. In the example illustrated in FIG. 1, two types of solutions are stored in two solution tanks 101*a* and 101*b*, respectively. In the present embodiment, the solution stored in the solution tank 101*a* is referred to as a first solution, and the solution stored in the solution tank 101*b* is referred to as a second solution.

Each of the liquid feeding pumps 102 pressurizes and feeds the solution stored in each of the solution tanks 101.

The liquid feeding pump 102 feeds liquid with sufficient pressure so as to obtain a flow rate for feeding liquid to the mass spectrometer 110 even in a state where the separation columns 105 having small conductance are disposed. As the liquid feeding pump 102, a pump capable of feeding liquid in a pressure range of typically about 0.1 to 100 MPa is used. Note that the separation columns 105 will be described later.

In the example illustrated in FIG. 1, pipes 121*a* and 121*b* connected to the respective solution tanks 101*a* and 101*b* branch into three pipes, respectively. The liquid feeding pump 102 is provided in each of the three branched pipes 122*a* and 122*b*. The first solution flows through the pipe 122*a*, and the second solution flows through the pipe 122*b*. Downstream of the liquid feeding pump 102, a pipe 123 (123*a* to 123*c*) through which the solution fed from the liquid feeding pump 102 joins and flows is disposed. In the example illustrated in FIG. 1, a set of the pipes 122*a* and 122*b* joins each pipe 123. Therefore, in the example illustrated in FIG. 1, since three pipes 122*a* and three pipes 122*b* are installed, three pipes 123 (pipes 123*a* to 123*c*) are installed.

The first solution and the second solution fed from the liquid feeding pump 102 are joined and mixed in each of the pipes 123. The mixed solution of the first solution and the second solution is fed in parallel in the pipes 123*a* to 123*c*.

Note that the liquid feeding pump 102 feeds a solution from the solution tank 101 to which the liquid feeding pump itself is connected, using a low pressure gradient. In this way, it is possible to feed the mixed solution to which a gradient is applied at an arbitrary mixing ratio.

The injector 103 injects a sample from a vial or the like into sample loops 124. Then, by switching the injection valves 104 by the processing device 2, each of the sample loops 124 into which the sample is injected is connected to any one of the pipes 123*a* to 123*c*. Each of the pipes 123 (123*a* to 123*c*) is connected to one of the separation columns 105 (105*a* to 105*c*). With such a configuration, the sample is injected into the separation columns 105. The mixed solution of the first solution and the second solution into which the sample is injected is appropriately referred to as a sample solution.

Each of pipes 125 (125*a* to 125*c*) is connected to a downstream side of each of the separation columns 105. That is, the sample solutions having passed through the respective separation columns 105 flow through the pipes 125*a* to 125*c*.

Then, any one of the pipes 125*a* to 125*c* is connected to the pipe 126 connected to the mass spectrometer 110 by the selector valve 106. That is, the selector valve 106 switches a connection destination of the pipe 126 connected to the mass spectrometer 110 to any one of the pipes 125*a* to 125*c* provided downstream of the separation columns 105.

Note that in the present embodiment, a system of the pipe 123*a*, the separation column 105*a*, and the pipe 125*a* is appropriately referred to as a first flow path. Similarly, a system of the pipe 123*b*, the separation column 105*b*, and the pipe 125*b* is appropriately referred to as a second flow path. Moreover, a system of the pipe 123*c*, the separation column 105*c*, and the pipe 125*c* is appropriately referred to as a third flow path. Furthermore, the first flow path to the third flow path are collectively referred to as flow paths as appropriate.

As illustrated in FIG. 1, the sample solution flows in parallel in each of the first flow path to the third flow path.

Note that, of the pipes 125*a* to 125*c*, a flow path not connected to the mass spectrometer 110 is connected to a waste liquid tank (not illustrated) by the selector valve 106. This makes it possible to prevent the sample solution from flowing out to the outside.

As described above, the plurality of pipes 125 (125*a* to 125*c*) passing through the independent separation columns 105 are connected to the mass spectrometer 110 via the selector valve 106. In the example illustrated in FIG. 1, the number of flow paths is three, but the method of the present embodiment can be applied as long as the number of flow paths is two or more.

The mass spectrometer 110 includes an ion source 111 and a capillary 112.

The mass spectrometer 110 measures components of a sample by ionizing the sample with the ion source 111 and separating the sample for each mass-to-charge ratio (m/z)

using an electric field or a magnetic field. The measurement result is output in the form of a signal intensity and input to the processing device 2.

As the ion source 111 for ionizing the sample, for example, an electrospray ionization ion source, an atmospheric pressure chemical ionization ion source, an atmospheric pressure photoionization ion source, or the like can be used. In any of the ion sources 111, a solution containing a sample is sprayed to the ion source 111 by the capillary 112 provided in the thin mass spectrometer 110.

(Processing Device 2)

Figure 2:
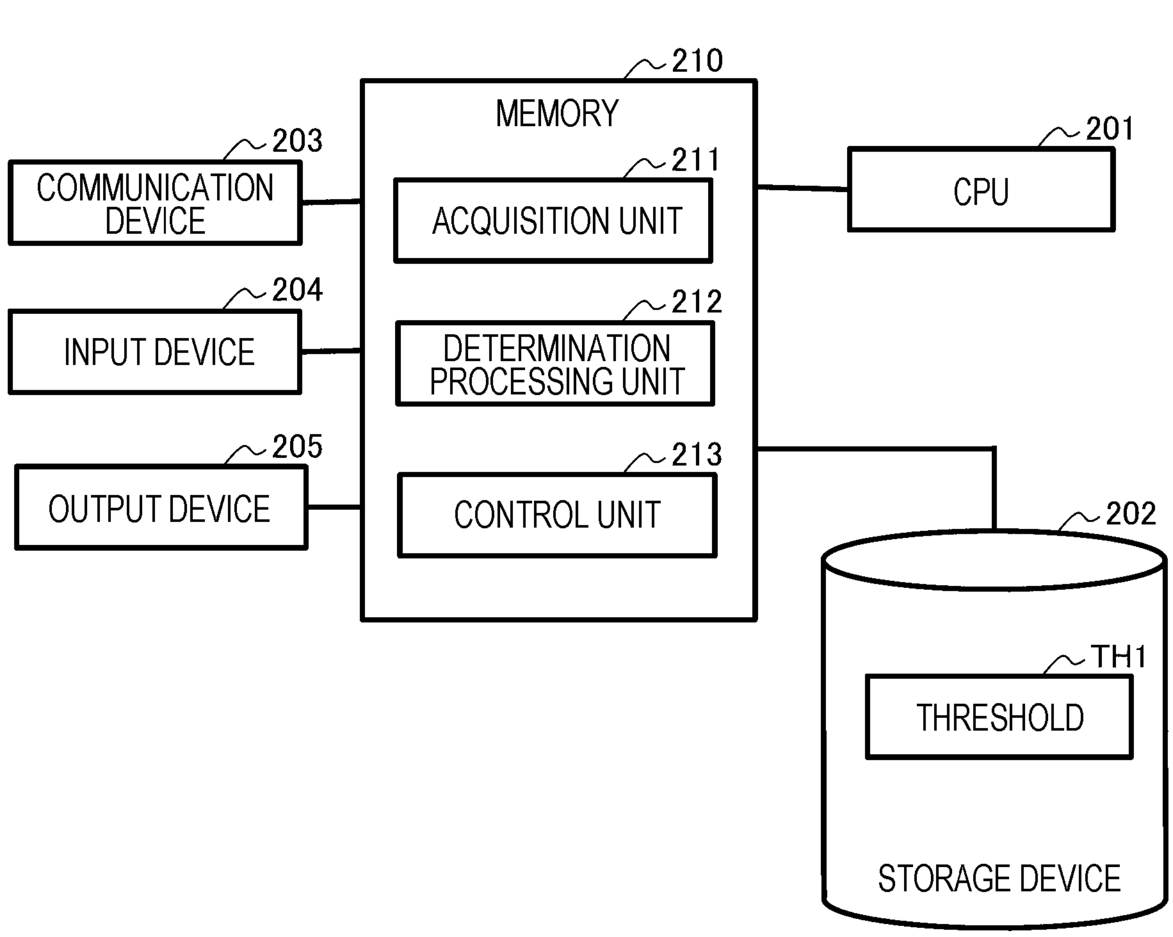
FIG. 2 is a functional block diagram illustrating a configuration of a processing device according to the first embodiment.

FIG. 2 is a functional block diagram illustrating a configuration of the processing device 2 in the first embodiment. FIG. 1 is referred to as appropriate.

The processing device 2 includes a personal computer (PC) or the like, and includes a central processing unit (CPU) 201. Furthermore, the processing device 2 includes a storage device 202 including a hard disk (HD), a solid state drive (SSD), or the like. Moreover, the processing device 2 includes a communication device 203 that transmits a control instruction for controlling the LC/MS 1 to the LC/MS 1 and receives a signal from the mass spectrometer 110. The processing device 2 includes an input device 204 such as a keyboard and an output device 205 such as a display. Furthermore, the processing device 2 includes a memory 210 including a random access memory (RAM) or the like. A program stored in the storage device 202 is loaded into the memory 210. Then, when the loaded program is executed by the CPU 201, an acquisition unit 211, a determination processing unit 212, and a control unit 213 are embodied.

The acquisition unit 211 acquires a measurement result (signal intensity) from the mass spectrometer 110.

The determination processing unit 212 makes a determination for identifying a contaminated site on the basis of the measurement result (signal intensity) acquired from the mass spectrometer 110.

The control unit 213 controls the liquid feeding pumps 102, the injection valves 104, and the selector valve 106.

Furthermore, the storage device 202 stores a threshold TH1 used when the determination processing unit 212 identifies a contaminated site.

(Flowchart)

A method of identifying a contaminated site according to the present embodiment will be described.

Figure 3:
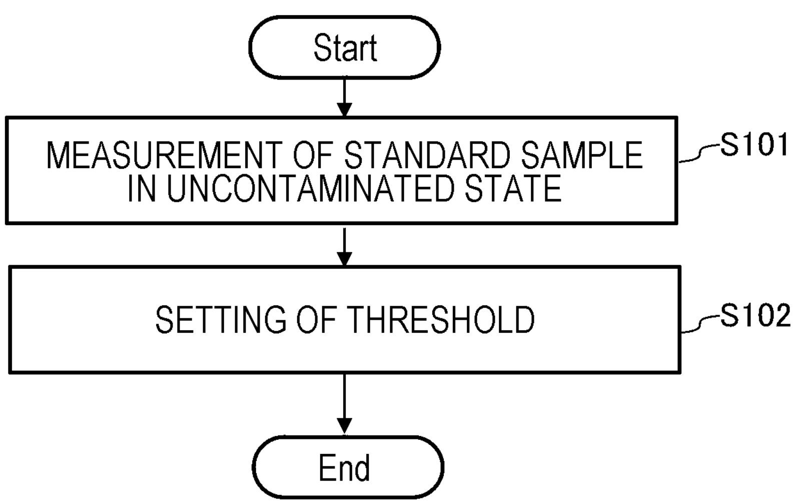
FIG. 3 illustrates a procedure of a threshold setting process according to the first embodiment.

FIG. 3 illustrates a procedure of a threshold setting process in the first embodiment. FIGS. 1 and 2 are appropriately referred to.

First, in an uncontaminated state, a standard sample having a known concentration is made to flow from the injector 103 to each flow path (the first flow path to the third flow path), and is measured by the mass spectrometer 110 (S101). The uncontaminated state is a state in which the solution tanks 101, the pipes 121*a*, 121*b*, 122*a*, 122*b*, 123, 125, and 126, the sample loops 124, the separation columns 105, the mass spectrometer 110, and the like are not contaminated.

The measurement result is acquired by the acquisition unit 211 of the processing device 2 as a signal intensity of the mass spectrometer 110 and stored in the storage device 202 of the processing device 2.

Then, the threshold TH1 is set based on an average value of the signal intensities of the standard samples acquired from each of the first flow path to the third flow path (S102). The threshold TH1 is determined and set by a user. However, the processing device 2 may calculate and set the threshold TH1. The set threshold TH1 is stored in the storage device 202. Note that one type of standard sample may be used in the first embodiment.

(Contaminated Site Determination Processing)

Figure 4:
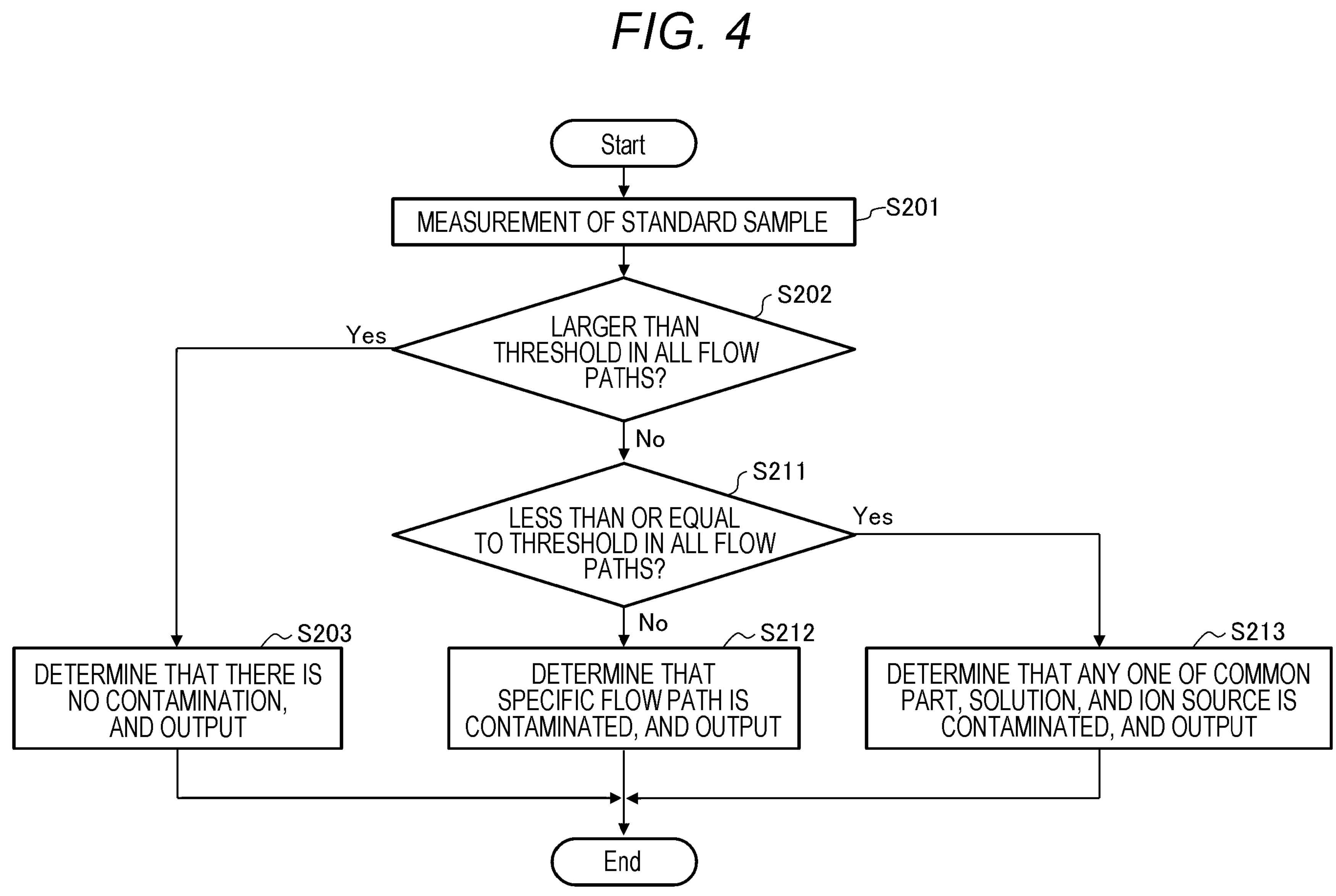
FIG. 4 is a flowchart illustrating a procedure of a contaminated site identification process performed in the first embodiment.

FIG. 4 is a flowchart illustrating a procedure of a contaminated site identification process performed in the first embodiment. FIGS. 1 and 2 are appropriately referred to. Note that details of each processing in FIG. 4 will be described later.

The process illustrated in FIG. 4 is performed after a predetermined period (for example, one month) has elapsed from the process illustrated in FIG. 3. Moreover, the process illustrated in FIG. 4 is performed at regular intervals (for example, every month).

First, a standard sample having conditions similar to those used in the process of FIG. 3 is made to flow into each of the flow paths (the first flow path to the third flow path). The similar conditions mean having a similar type, a similar concentration, and a similar measurement condition. Then, the mass spectrometer 110 measures the standard sample for each of the first flow path to the third flow path (S201). In the measurement, each of the first flow path to the third flow path is connected to the mass spectrometer 110 by the selector valve 106, and the measurement is performed each time.

Then, the determination processing unit 212 of the processing device 2 compares the measurement result (signal intensity of the mass spectrometer 110) obtained by the processing of step S201 with the set threshold TH1. The signal intensity depends on measurement conditions such as temperatures of the separation columns 105, a condition of a mobile phase, a condition of the gradient, and an electrode voltage setting of the mass spectrometer 110. Furthermore, the mobile phase corresponds to the pipes 122*a* and 122*b* to the pipe 126 in FIG. 1. The condition of the mobile phase is a temperature condition or the like in the mobile phase.

Then, the determination processing unit 212 determines whether or not the signal intensity is larger than the threshold TH1 in all the flow paths (all of the first flow path to the third flow path) (S202).

In a case where the signal intensity is larger than the threshold TH1 in all the flow paths (S202→Yes), the determination processing unit 212 determines that there is no contamination and outputs the determination result to the output device 205 (S203).

Furthermore, in a case where there is a flow path in which the signal intensity is lower than the threshold TH1 (S202→No), the determination processing unit 212 determines whether or not the signal intensity is less than or equal to the threshold TH1 in all the flow paths (S211).

In a case where the signal intensity is not less than or equal to the threshold TH1 in all the flow paths (S211→No), the determination processing unit 212 determines that a flow path (specific flow path) is contaminated, and outputs the determination result to the output device 205 (S212). That the flow path is contaminated means that any one of the pipes 122*a*, 122*b*, 123, and 125, the sample loops 124, the liquid feeding pumps 102, and the separation columns 105 constituting the flow path is contaminated.

In a case where the signal intensity is less than or equal to the threshold TH1 in all the flow paths (S211→Yes), the determination processing unit 212 determines that any one of a common part, the solution, and the ion source 111 is contaminated, and outputs the determination result to the output device 205 (S213). The common part is the selector valve 106, the pipe 126, the injector 103, and the capillary 112 of the mass spectrometer 110.

(Details of Determination Process)

Next, details of the process of FIG. 4 will be described with reference to FIGS. 5A and 5B.

Figure 5A:
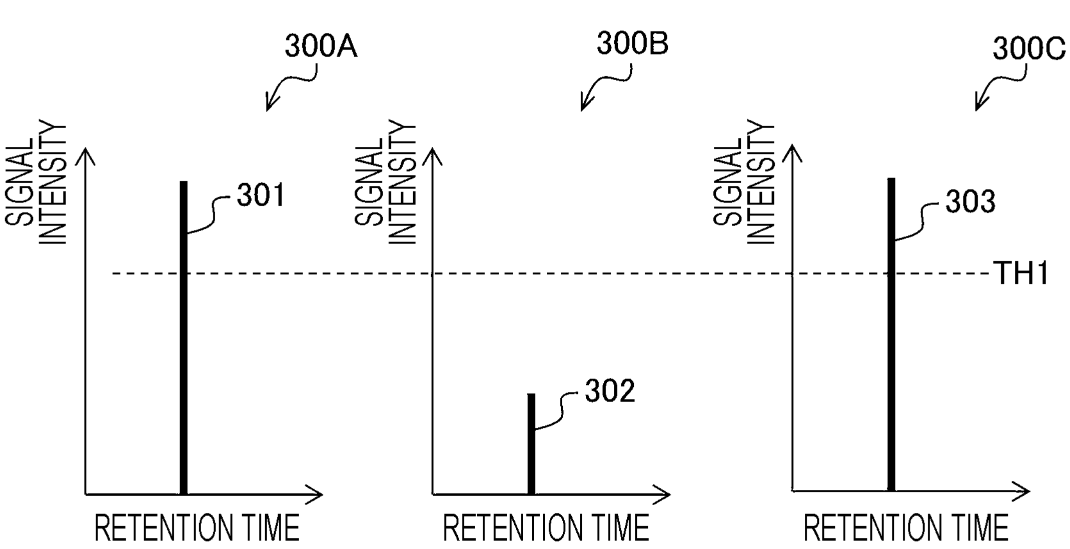
FIG. 5A is a diagram (part 1) illustrating a signal intensity of a mass spectrometer of a standard sample measured for each flow path.
Figure 5B:
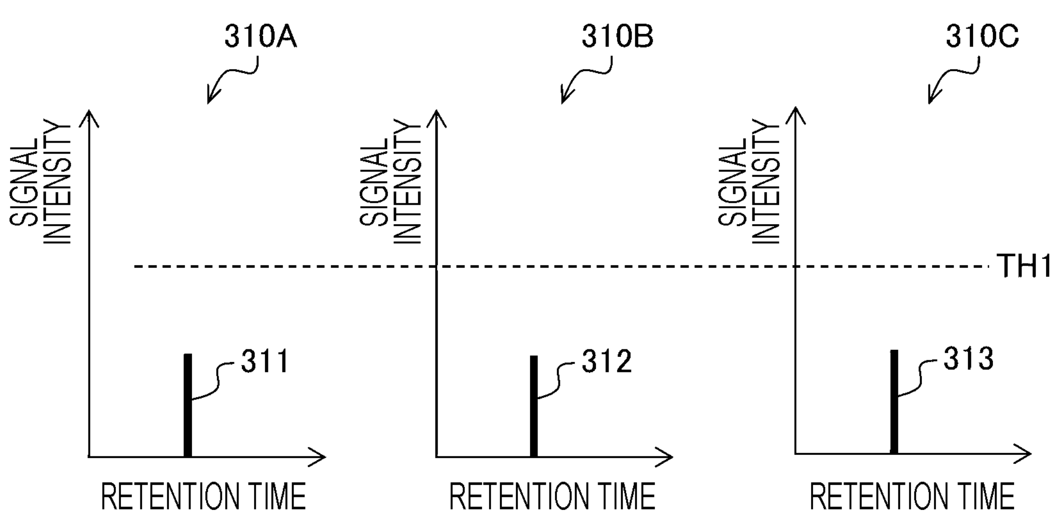
FIG. 5B is a diagram illustrating a signal intensity of the mass spectrometer of the standard sample measured for each flow path.

FIGS. 5A and 5B are diagrams illustrating the signal intensity of the mass spectrometer 110 of the standard sample measured for each flow path.

In FIGS. 5A and 5B, the horizontal axis represents the time (retention time) required from injection of a sample into the LC column to elution. Then, the vertical axis represents a signal intensity (that is, the measurement result of the sample (standard sample in the present embodiment)) of ions of the standard sample detected by separating m/z by the mass spectrometer 110. Incidentally, the LC retention time and m/z of ions generated by the ion source 111 are values unique to a substance constituting the sample (standard sample in the present embodiment).

In FIG. 5A, a signal intensity 301 in a graph 300A indicates a result measured in the first flow path. Furthermore, a signal intensity 302 in a graph 300B indicates a result of measurement in the second flow path. Moreover, a signal intensity 303 in a graph 300C indicates a result measured in the third flow path.

In the result illustrated in FIG. 5A, the signal intensity 302 of the standard sample is less than or equal to the threshold TH1 only in a specific flow path (the graph 300B: the second flow path in the example illustrated in FIG. 5A). Then, in the others (the graphs 300A and 300C: the first flow path and the third flow path), the signal intensities 301 and 303 are larger than the threshold TH1. Such a measurement result indicates that the flow path (the second flow path in the example of FIG. 5A) in which the signal intensity is less than or equal to the threshold TH is contaminated, and the signal intensity of the standard sample decreases due to the ion suppression by the impurities eluted from the contaminated site. As described above, the contamination of the flow path means that any one of the pipes 122a, 122b, 123, and 125, the sample loops 124, the liquid feeding pumps 102, and the separation columns 105 constituting the flow path is contaminated.

Therefore, in a case where the measurement result (signal intensity) as illustrated in FIG. 5A is obtained, the determination processing unit 212 determines that contamination occurs in a specific flow path (the second flow path in the example of FIG. 5A) (step S212 in FIG. 4). That is, FIG. 5A corresponds to a result of selecting step S202 "No"→step S211 "No" in the process illustrated in FIG. 4. As described above, the determination is made based on the measurement result illustrated in FIG. 5A, whereby contamination of a specific flow path can be easily detected.

Next, FIG. 5B will be described.

In FIG. 5B, a signal intensity 311 in a graph 310A indicates a result measured in the first flow path. Furthermore, a signal intensity 312 in a graph 310B indicates a result of measurement in the second flow path. Moreover, a signal intensity 313 in a graph 310C indicates a result measured in the third flow path.

In the example illustrated in FIG. 5B, the signal intensity of the mass spectrometer 110 decreases to the same extent in the measurements of all the flow paths, and is less than or equal to the threshold value TH1. That is, as indicated by the graphs 310A to 310C, all of the signal intensities 311 to 313 obtained in the first flow path to the third flow path are lower than the threshold TH1. Such results indicate that any one of the common part, the solution, and the ion source 111 is contaminated. That is, the example illustrated in FIG. 5B illustrates that the signal intensity has decreased due to ion suppression by impurities eluted from the contaminated site or charge-up of an electrode inside the mass spectrometer 110. As described above, the common part is the selector valve 106, the pipe 126, the injector 103, and the capillary 112 of the mass spectrometer 110.

Incidentally, the result illustrated in FIG. 5B corresponds to step S213 in FIG. 4. That is, FIG. 5B corresponds to a result of selecting step S202 "No"→step S211 "Yes" in the process illustrated in FIG. 4.

As described above, the determination is made based on the measurement result illustrated in FIG. 5B, whereby contamination of the common part, the solution, and the ion source 111 can be easily detected.

Note that even in a case where the pipes 122a, 122b, 123, and 125 constituting all the flow paths, the sample loops 124, the liquid feeding pumps 102, and the separation columns 105 are simultaneously contaminated to the same extent, the signal intensity decreases in the measurement of all the flow paths as in FIG. 5B. However, since contamination of the flow paths generally occurs independently for each flow path, the probability that the pipes 122a in all the flow paths are contaminated at the same time is low. The same applies to the pipes 122b, 123, and 125, the sample loops 124, the liquid feeding pumps 102, and the separation columns 105. Therefore, by performing the measurement of the contaminated site identification at a sufficiently high frequency, the possibility that all the flow paths are contaminated at the same time can be suppressed low.

Summary of First Embodiment

The determination of the contaminated site in the first embodiment is summarized in the table illustrated in FIG. 6. FIGS. 1 and 2 are appropriately referred to.

As illustrated in FIG. 6, in a case where the signal intensity is lower than the threshold TH1 in all the flow paths, the determination processing unit 212 determines that contamination occurs in any one of the common part, the solution, and the ion source 111 of the mass spectrometer 110 (step S213 in FIG. 4, FIG. 5B).

Furthermore, in a case where the signal intensity is lower than the threshold TH1 only in a specific flow path, the determination processing unit 212 determines that the flow path is contaminated. Specifically, it is determined that any one of the pipes 122a, 122b, 123, and 125, the sample loops 124, the liquid feeding pumps 102, and the separation columns 105 in the flow path with low signal intensity is contaminated (step S212 in FIG. 4, FIG. 5A).

As described above, in the first embodiment, the signal intensity of each flow path is compared with the threshold TH1, whereby a contamination state of at least one of the mobile phase and the mass spectrometer 110 (ion source 111, capillary 112) can be determined.

Then, according to the first embodiment, the contaminated site is identified by the signal intensity acquired from the mass spectrometer 110. This makes it possible to identify a contaminated site without adding a special device. Furthermore, by identifying the contaminated site by the signal intensity acquired from the mass spectrometer 110, it is possible to identify the contaminated site regardless of a machine difference of the LC/MS 1.

Second Embodiment

Next, a second embodiment of the present invention will be described with reference to FIGS. 7 to 12.

In the second embodiment, a mixed sample of a plurality of components having different ionization efficiencies is used as a standard sample. In the second embodiment, a standard sample containing two types of components (referred to as a first component and a second component.) is used.

Note that in the second embodiment, since a configuration of the LC/MS system Z is similar to that in FIG. 1, the description thereof will be omitted.

(Processing Device 2*a*)

Figure 7:
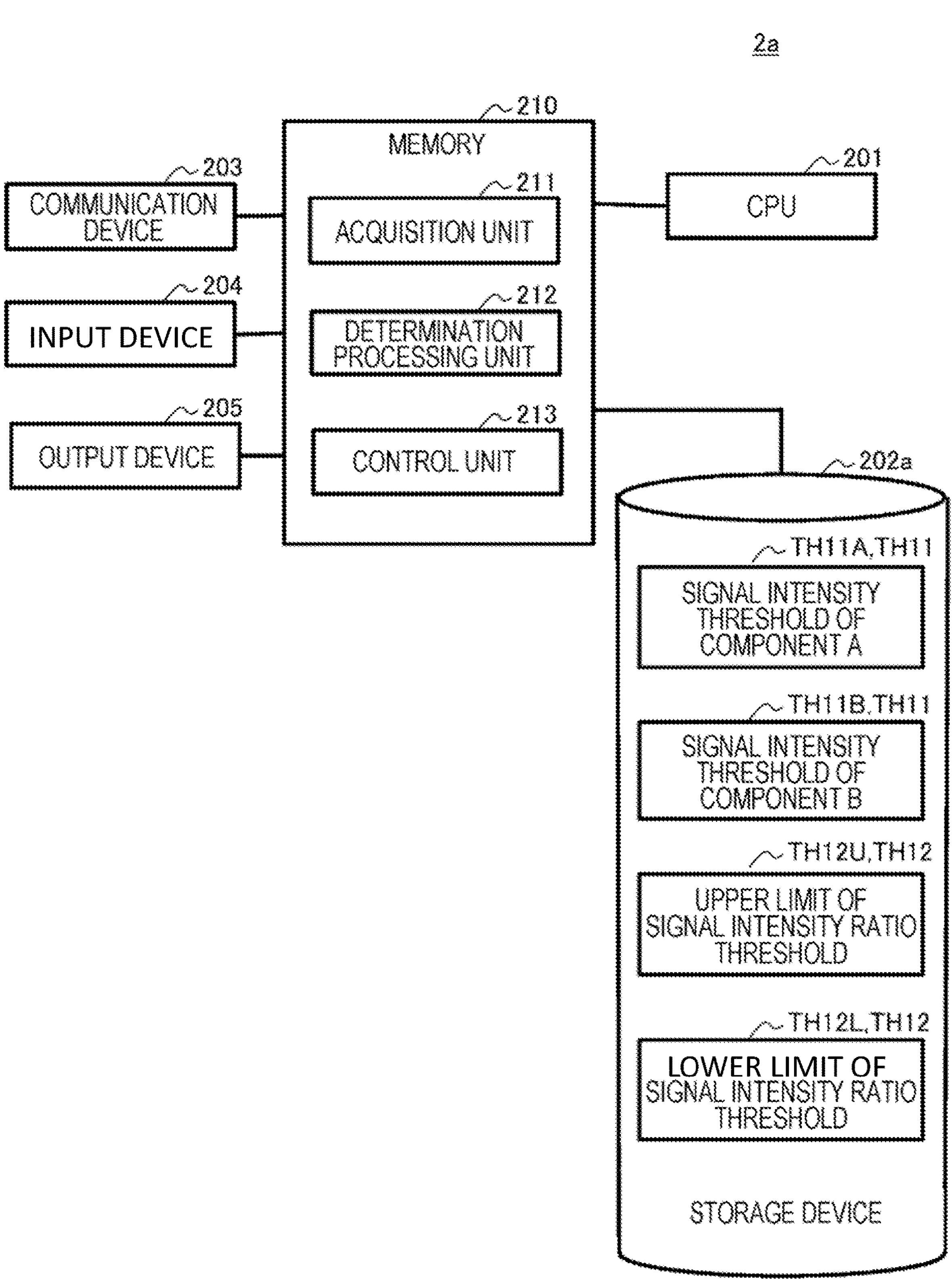
FIG. 7 is a functional block diagram illustrating a configuration example of a processing device according to a second embodiment.

FIG. 7 is a functional block diagram illustrating a configuration example of a processing device 2*a* in the second embodiment.

In FIG. 7, the same components as those in FIG. 2 are denoted by the same reference signs, and the description thereof will be omitted.

In the processing device 2*a* illustrated in FIG. 7, a signal intensity threshold TH11A of the first component (component A), a signal intensity threshold TH11B of the second component (component B), an upper limit TH12U of a signal intensity ratio threshold TH12, and a lower limit TH12L of a signal intensity ratio threshold TH12 are stored in the storage device 202*a*. The signal intensity threshold TH11A of the first component, the signal intensity threshold TH11B of the second component, the upper limit TH12U of the signal intensity ratio threshold TH12, and the lower limit TH12L of the signal intensity ratio threshold TH12 will be described later. Hereinafter, the signal intensity threshold TH11A of the first component and the signal intensity threshold TH11B of the second component are collectively referred to as a signal intensity threshold TH11 as appropriate. Furthermore, the upper limit TH12U of the signal intensity ratio threshold TH12 and the lower limit TH12L of the signal intensity ratio threshold TH12 are collectively referred to as a signal intensity ratio threshold TH12 as appropriate.

In the second embodiment, the signal intensity of each component in the standard sample is compared with the signal intensity threshold TH11 (signal intensity threshold TH11A of the first component and signal intensity threshold TH11B of the second component). Moreover, in the second embodiment, a ratio of signal intensities (signal intensity ratio) acquired from the mass spectrometer 110 for each component of the standard sample is calculated for each flow path. Then, the signal intensity ratio and the signal intensity ratio threshold TH12 are compared. As described later, specifically, the signal intensity ratio is compared with the upper limit TH12U of the signal intensity ratio threshold TH12 and the lower limit TH12L of the signal intensity ratio threshold TH12.

Furthermore, as described later, the signal intensity threshold TH11 and the signal intensity ratio threshold TH12 are determined and set in advance by the user by measuring a standard sample having a known concentration in advance in a state where no contamination occurs in the mass spectrometer 110. The set signal intensity threshold TH11 and signal intensity ratio threshold TH12 are stored in the storage device 202*a* of the processing device 2*a*.

(Flowchart)

Figure 8:
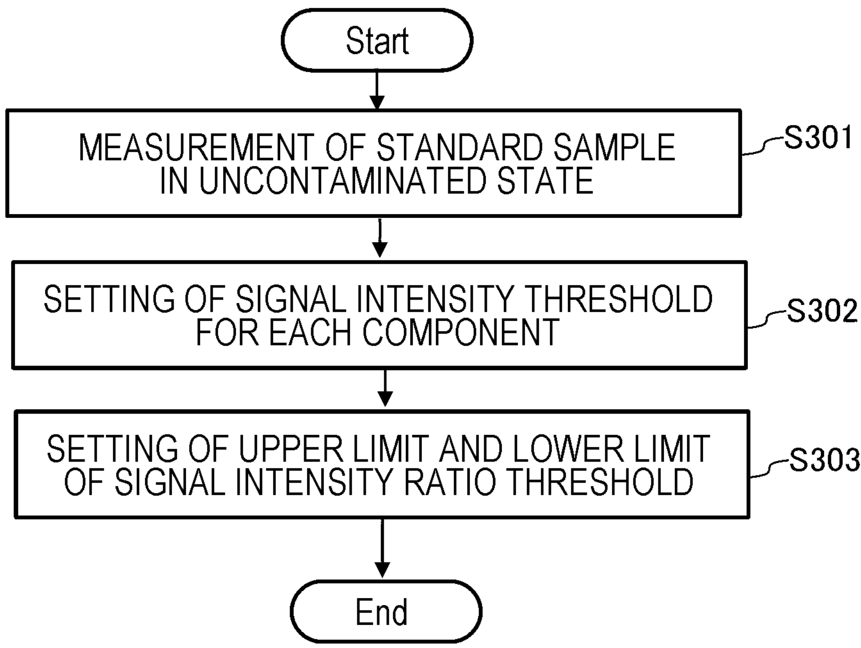
FIG. 8 is a flowchart illustrating a procedure of a process of setting various thresholds in the second embodiment.

FIG. 8 is a flowchart illustrating a procedure of a process of setting various thresholds in the second embodiment.

First, in an uncontaminated state, a standard sample having a known concentration is made to flow from the injector 103 to each of the flow paths (the first flow path to the third flow path), and is measured by the mass spectrometer 110 (S301). The uncontaminated state is a state in which the solution tanks 101, the pipes 121*a*, 121*b*, 122*a*, 122*b*, 123, 125, and 126, the sample loops 124, the separation columns 105, the mass spectrometer 110, and the like are not contaminated. At this time, a standard sample, which is a mixed sample having the first component and the second component, flows through the first flow path to the third flow path. Then, the flow path connected to the mass spectrometer 110 is sequentially switched by the selector valve 106, and the mass spectrometer 110 measures the first component and the second component for each of the first flow path to the third flow path. Note that since the time during which the first component and the second component pass through the separation column 105 is different, the measurement of each component is performed with a time difference.

Next, the user sets a signal intensity threshold TH11 based on the signal intensity of each component acquired in step S301 (measurement of the standard sample in a state where no contamination occurs) (S302). That is, the user sets the signal intensity threshold TH11A of the first component on the basis of an average value or the like of the signal intensities acquired from each of the first flow path to the third flow path for the first component. Similarly, the user sets the signal intensity threshold TH11B of the second component on the basis of an average value or the like of the signal intensities acquired from each of the first flow path to the third flow path for the second component.

Subsequently, the user sets the signal intensity ratio threshold TH12 on the basis of the signal intensity acquired in step S301 (S303). That is, the user sets the upper limit TH12U and the lower limit TH12L of the signal intensity ratio threshold TH12 based on an average value or the like of the signal intensities acquired from each of the first flow path to the third flow path for each component.

The set signal intensity threshold TH11 and signal intensity ratio threshold TH12 are stored in the storage device 202*a*. Note that the signal intensity threshold TH11 and the signal intensity ratio threshold TH12 may be calculated and set by the user, or may be calculated and set by the processing device 2.

(Contaminated Site Determination Processing)

Figure 9:
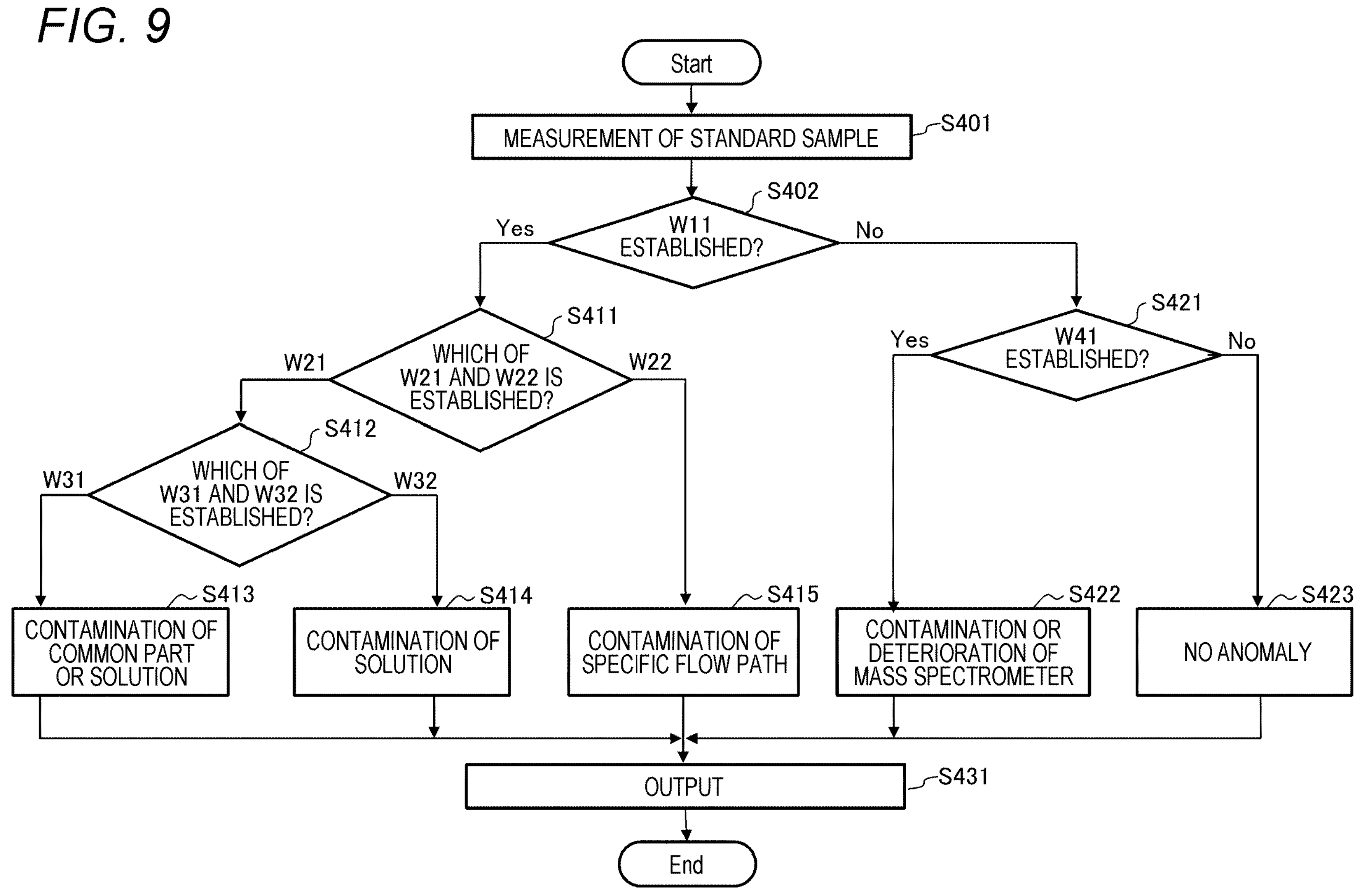
FIG. 9 is a flowchart illustrating a procedure of a contaminated site identification process performed in the second embodiment.

FIG. 9 is a flowchart illustrating a procedure of a contaminated site identification process performed in the second embodiment. FIGS. 1 and 7 are appropriately referred to. Furthermore, details of each processing in FIG. 9 will be described later. The process illustrated in FIG. 9 is performed after a predetermined period (for example, one month) has elapsed from the process illustrated in FIG. 8. Moreover, the processing illustrated in FIG. 9 is performed every certain period (for example, every month).

First, the standard sample used in FIG. 8 is caused to flow into each of the flow paths (first flow path to third flow path). As described above, in the example of FIG. 8, since the standard sample which is the mixed sample having two components (the first component and the second component) is flowed to each of the first flow path to the third flow path, the standard sample is flowed under the same conditions also in the present processing. At this time, the condition under which the standard sample flows (concentration, measurement conditions, etc.) is set to be the same condition as the measurement in step S301 of FIG. 8.

Then, the mass spectrometer 110 measures the standard sample in each component and each flow path (S401). In the measurement, each flow path is connected to the mass spectrometer 110 by the selector valve 106 one by one, and each time, the standard sample is measured for each flow path by the mass spectrometer 110. This measurement is performed for each component (the first component and the second component in the present embodiment). Note that since the time during which the first component and the second component pass through the separation column 105 is different as described above, the signal intensity of each component is measured with a time difference.

Subsequently, the determination processing unit 212 of the processing device 2*a* determines whether or not a condition W11 is established (S402). Here, the condition W11 is whether or not the signal intensity ratio is out of the range of the signal intensity ratio threshold TH12 in any one of the flow paths. The range of the signal intensity ratio threshold TH12 is a range between the upper limit TH12U and the lower limit TH12L of the signal intensity ratio threshold TH12 (signal intensity ratio threshold range TH12R in FIGS. 10A to 10C).

In a case where the condition W11 is established (Yes in S402), the determination processing unit 212 determines which of a condition W21 and a condition W22 is established (S411).

The conditions W21 and W22 are the following conditions.

(Condition W21) The signal intensity is less than or equal to the signal intensity threshold TH11 in all the flow paths, and the signal intensity ratio is out of the range of the signal intensity ratio threshold TH12 in all the flow paths.

(Condition W22) The signal intensity is less than or equal to the signal intensity threshold TH11 in a specific flow path, and the signal intensity ratio is out of the range of the signal intensity ratio threshold TH12 in the flow path.

In a case where the condition W21 is established in step S411 (S411→W21), the determination processing unit 212 determines which of a condition W31 and a condition W32 is established (S412).

The conditions W31 and W32 are the following conditions.

(Condition W31) A decrease width of the signal intensity in the component having a low ionization efficiency is larger than that in the component having a high ionization efficiency, and X/X0 in the component having a low ionization efficiency is lower than that in the component having a high ionization efficiency. Here, X is the signal intensity measured in step S401, and X0 is the signal intensity measured in step S301 in FIG. 8. Note that the ionization efficiency is the ease of ionization in the ion source 111 of the mass spectrometer 110, and the higher the ionization efficiency, the easier the ionization in the ion source 111. Furthermore, the definition of the decrease width will be described later.

(Condition W32) A decrease width of the signal intensity of the component having a high ionization efficiency is larger than that of the component having a low ionization efficiency, and X/X0 of the component having a high ionization efficiency is lower than that of the component having a low ionization efficiency. Note that the definition of the decrease width will be described later.

In a case where the condition W31 is established in step S412 (S412→W31), the determination processing unit 212 determines that contamination of the common part or the solution occurs (S413), and outputs the determination result from the output device 205 (S431). Note that as described later, the possibility of contamination of the solution in step S413 can be reduced by increasing the frequency of performing the present processing. Furthermore, similarly to the first embodiment, the common part includes the selector valve 106, the pipe 126, the injector 103, and the capillary 112 of the mass spectrometer 110.

In a case where the condition W32 is established in step S412 (S412→W32), the determination processing unit 212 determines that the solution is contaminated (S414), and outputs the determination result from the output device 205 (S431).

In a case where the condition W22 is established in step S411 (S411→W22), the determination processing unit 212 determines that contamination has occurred in the flow path (specific flow path) in which the condition W22 is established (S415), and outputs the determination result to the output device 205 (S431).

In a case where the condition W11 is not established in step S402 (S402→No), the determination processing unit 212 determines whether or not a condition W41 is established (S421).

The condition W41 is the following condition.

(Condition W41) The signal intensity is lower than the signal intensity threshold TH11 for all components and for all flow paths.

In a case where the condition W41 is established in step S421 (S421→Yes), the determination processing unit 212 determines that contamination or deterioration has occurred in the mass spectrometer 110 (S422), and outputs the determination result from the output device 205 (S431).

In a case where the condition W41 is not established in step S421 (S421→No), the determination processing unit 212 determines that there is no anomaly (S423), and outputs the determination result from the output device 205 (S431).

(Details of Determination Process)

Next, the determination in each processing of FIG. 9 will be described in detail with reference to FIGS. 10A to 10C and FIGS. 11A and 11B.

FIGS. 10A to 10C are diagrams illustrating the signal intensity of the mass spectrometer 110 of the standard sample (first component and second component) measured for each flow path.

In the upper part of FIGS. 10A to 10C, the horizontal axis represents LC retention time. Then, the vertical axis represents signal intensity of ions related to components contained in the standard sample detected by separating m/z by the mass spectrometer 110. A relationship between the retention time and the m/z of the ion is a value unique to the substance, and thus is generally different for each component.

Furthermore, in each of FIGS. 10A to 10C, signal intensity ratios in the respective flow paths are illustrated in the lower part. Note that when the signal intensity of the first component is XA and the signal intensity of the second component is XB, the signal intensity ratio is defined by XA/XB.

Furthermore, in the following description, it is assumed that the ionization efficiency of the second component is higher than that of the first component.

First, a case where the measurement result illustrated in FIG. 10A is obtained will be described.

In FIG. 10A, in the upper part (graphs 400A to 400C), the signal intensity of each of the first component and the second component in each flow path is illustrated. Note that in FIG. 10A, in the graphs 400A to 400C, a graph 400A illustrates the measurement result in the first flow path, a graph 400B illustrates the measurement result in the second flow path, and a graph 400C illustrates the measurement result in the third flow path. Furthermore, in the graph 400A, a signal intensity 401A is the signal intensity related to the first component, and a signal intensity 401B is the signal intensity related to the second component. Similarly, in the graph 400B, a signal intensity 402A is the signal intensity related to the first component, and a signal intensity 402B is the signal intensity related to the second component. Moreover, in the graph 400C, a signal intensity 403A is the signal intensity related to the first component, and a signal intensity 403B is the signal intensity related to the second component. As described above, since the time for the first component and the second component to pass through the separation column 105 is different, the signal intensities 401A to 403A of the first component and the signal intensities 401B to 403B of the second component are measured with a time difference as illustrated in the graphs 400A to 400C.

Furthermore, as illustrated in graphs 400A to 400C of FIG. 10A, the signal intensity threshold TH11A of the first component and the signal intensity threshold TH11B of the second component are set.

In the lower part (a graph 400D) of FIG. 10A, a signal intensity ratio 404A indicates the signal intensity ratio in the first flow path, a signal intensity ratio 404B indicates the signal intensity ratio in the second flow path, and a signal intensity ratio 404C indicates the signal intensity ratio in the third flow path.

Moreover, as illustrated in the graph 400D, the upper limit TH12U and the lower limit TH12L of the signal intensity ratio threshold TH12 are set. Moreover, a signal intensity ratio threshold range TH12R is set as a range of the upper limit TH12U and the lower limit TH12L of the signal intensity ratio threshold TH12.

Furthermore, in the graph 400D, a signal intensity ratio R indicates the signal intensity ratio in a case where there is no contamination. The signal intensity ratio R in the absence of contamination is measured in advance (step S301 in FIG. 8). The upper limit TH12U and the lower limit TH12L of the signal intensity ratio threshold TH12 are set based on the signal intensity ratio R. Note that the case where there is no contamination is described in step S301 of FIG. 8.

In FIG. 10A, as illustrated in graphs 400B and 400D, a specific flow path (In the example illustrated in FIG. 10A, the second flow path: hereinafter, a specific flow path will be described as the second flow path.) satisfies conditions W22*a* and W22*b* illustrated below.

(Condition W22*a*) As illustrated in the graph 400B, both the signal intensities 402A and 402B of the first component and the second component decrease to be less than or equal to the signal intensity thresholds TH11A and TH11B, respectively.

(Condition W22*b*) As illustrated in the graph 400D, the signal intensity ratio 404B of the second flow path also changes from the signal intensity ratio R in a state where there is no contamination, and is less than or equal to the lower limit TH12L of the signal intensity ratio threshold TH12 or more than or equal to the upper limit TH12U of the signal intensity ratio threshold TH12. That is, only the signal intensity ratio 404B of the second flow path is located outside the signal intensity ratio threshold range TH12R. Note that, in the present embodiment, "the signal intensity ratio changes from the signal intensity ratio R in a state where there is no contamination" means that the signal intensity ratio was originally in a state of the signal intensity ratio R in an uncontaminated state, but the signal intensity ratio changed and decreased due to contamination. Furthermore, the condition W22*a* and the condition W22*b* correspond to the condition W22 in FIG. 9. That is, FIG. 10A corresponds to step S411: W22→step S415 in FIG. 9.

The case illustrated in FIG. 10A indicates that the flow path (the second flow path in the example illustrated in FIG. 10A) satisfying conditions W22*a* and W22*b* is contaminated. That the flow path is contaminated means that any one of the pipes 122*a*, 122*b*, 123, and 125, the sample loops 124, the liquid feeding pumps 102, and the separation columns 105 constituting the flow path is contaminated. That is, the case illustrated in FIG. 10A illustrates that the signal intensity of the standard sample was decreased by the ion suppression by impurities eluted from the contaminated site in the second flow path. Note that since the first component has a lower ionization efficiency than the second component, the influence of ion suppression due to the impurities is large. Therefore, in the graph 400B of FIG. 10A, the signal intensity 402A of the first component is lower than the signal intensity 402B of the second component. Furthermore, when the signal intensity 402A of the first component is lower than the signal intensity 402B of the second component, the signal intensity ratio 404B is also greatly changed.

As described above, the determination is made based on the measurement result illustrated in FIG. 10, so that the contamination in the specific flow path can be easily detected.

Next, FIG. 10B will be described.

In FIG. 10B, the upper part (graphs 410A to 410C) illustrates the signal intensity of each of the first component and the second component in each flow path. Note that in FIG. 10B, a graph 410A illustrates the measurement result in the first flow path, a graph 410B illustrates the measurement result in the second flow path, and a graph 410C illustrates the measurement result in the third flow path. Furthermore, in the graph 410A, a signal intensity 411A is the signal intensity related to the first component, and a signal intensity 411B is the signal intensity related to the second component. Similarly, in the graph 410B, a signal intensity 412A is the signal intensity related to the first component, and a signal intensity 412B is the signal intensity related to the second component. Moreover, in the graph 410C, a signal intensity 413A is the signal intensity related to the first component, and a signal intensity 413B is the signal intensity related to the second component.

In the lower stage (graph 410D) of FIG. 10B, a signal intensity ratio 414A indicates the signal intensity ratio in the first flow path, a signal intensity ratio 414B indicates the signal intensity ratio in the second flow path, and a signal intensity ratio 414C indicates the signal intensity ratio in the third flow path.

Moreover, as illustrated in the graph 410D, the upper limit TH12U and the lower limit TH12L of the signal intensity ratio threshold TH12 are set. Moreover, a signal intensity ratio threshold range TH12R is set as a range of the upper limit TH12U and the lower limit TH12L of the signal intensity ratio threshold TH12.

Furthermore, in the graph 410D of FIG. 10B, a signal intensity ratio R indicates the signal intensity ratio in a case where there is no contamination. The signal intensity ratio R in the absence of contamination is measured in advance (step S301 in FIG. 8). As described above, the upper limit TH12U and the lower limit TH12L of the signal intensity ratio threshold range TH12R are set based on the signal intensity ratio R. Note that the case where there is no contamination is described in step S301 of FIG. 8.

Furthermore, in FIG. 10B, the signal intensity threshold TH11A of the first component, the signal intensity threshold TH11B of the second component, and the upper limit TH12U and the lower limit TH12L of the signal intensity ratio threshold range TH12R are values similar to those in FIG. 10A.

In the example illustrated in FIG. 10B, the following conditions W21*a* and W21*b* are satisfied.

(Condition W21*a*) As illustrated in the graphs 410A to 410C, the signal intensity is less than or equal to the signal intensity threshold TH11 in all the flow paths (the first flow path to the third flow path) and all the components (first component and second component). Specifically, all of the signal intensities 411A to 413A are values lower than the signal intensity threshold TH11A of the first component. Similarly, all of the signal intensities 411B to 413B are values lower than the signal intensity threshold TH11B of the second component.

(Condition W21*b*) As illustrated in the graph 410D, in all the flow paths (the first flow path to the third flow path), the signal intensity ratios 414A to 414C are less than or equal to the lower limit TH12L or more than or equal to the upper limit TH12U of the signal intensity ratio threshold range TH12R. That is, the signal intensity ratio is located outside the signal intensity ratio threshold range TH12R in all the flow paths. Note that FIG. 10B illustrates a case where the signal intensity ratios 414A to 414C of all the components are lower than the lower limit TH12L of the signal intensity ratio threshold range TH12R in all the flow paths. However, the signal intensity ratios 414A to 414C of all the components may be higher than the upper limit TH12U of the signal intensity ratio threshold range TH12R.

The establishment of the condition W21*a* and the condition W21*b* corresponds to the establishment of the condition W21 in FIG. 9 (step S411: W21).

In the case of FIG. 10B, it can be seen that the signal intensity decreased due to ion suppression caused by contamination of the solution or contamination of the common part. Here, the common part is the selector valve 106, the pipe 126, the injector 103, and the capillary 112 of the mass spectrometer 110.

As described above, in the case of FIG. 10B, the contamination of the solution or the contamination of the common part is considered. Therefore, in a case where the case of FIG. 10B occurs, the case is further separated by FIGS. 11A and 11B.

Figure 11A:
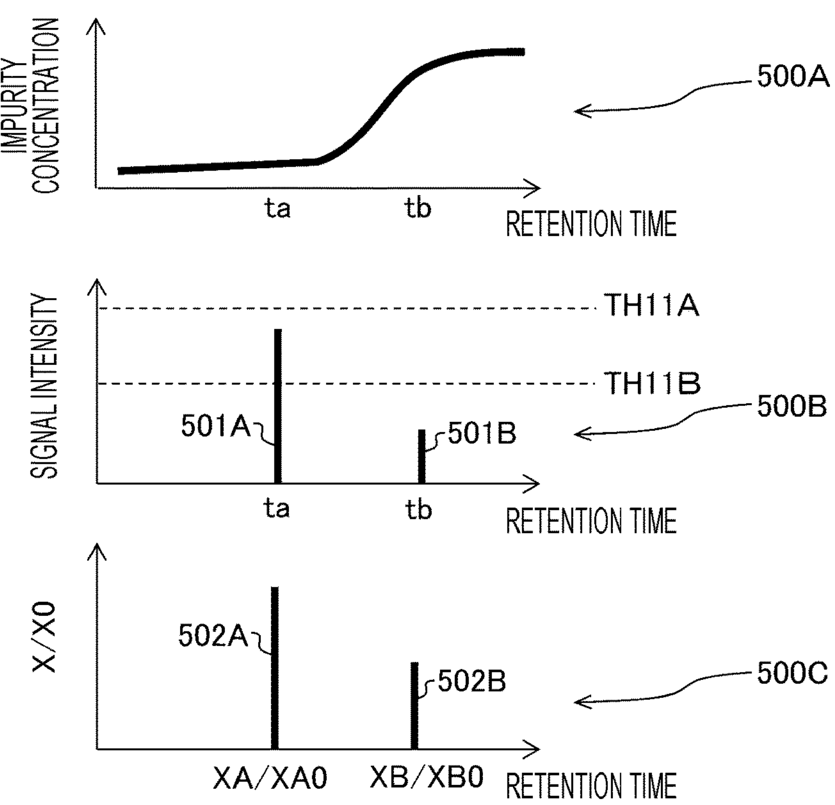
FIG. 11A is a diagram (part 1) illustrating a relationship between the concentration of impurities and retention time, and a relationship between a signal intensity and a signal intensity/initial value of a mass spectrometer 110 and the retention time of components.
Figure 11B:
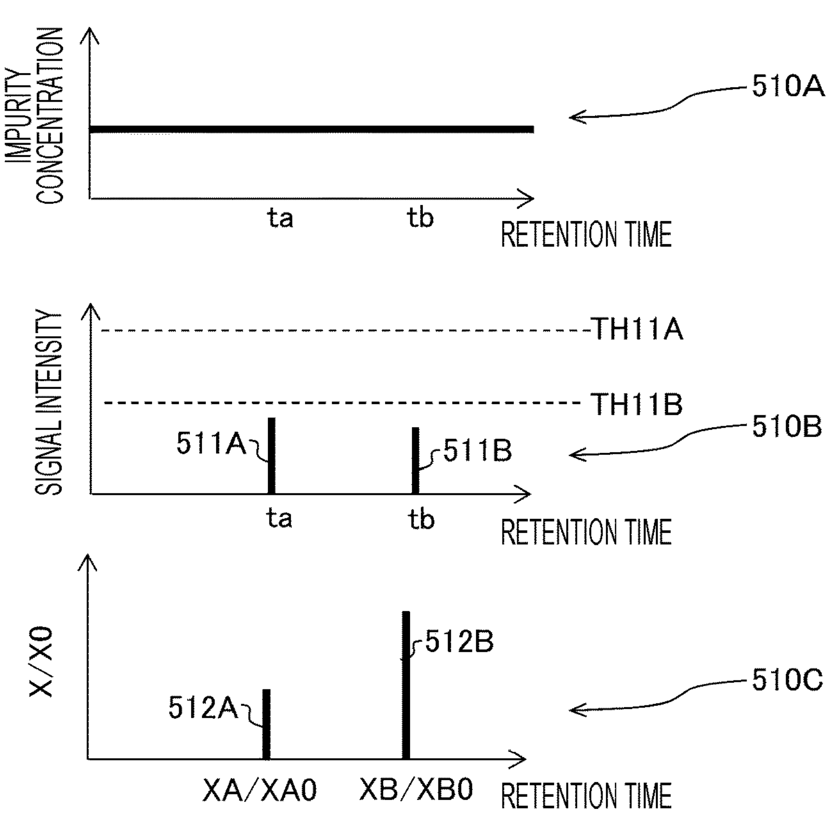
FIG. 11B is a diagram (part 2) illustrating a relationship between the concentration of impurities and retention time, and a relationship between a signal intensity and a signal intensity/initial value of the mass spectrometer 110 and the retention time of components.

FIGS. 11A and 11B are diagrams illustrating a relationship between the concentration of impurities and the retention time, and a relationship between the signal intensity of the mass spectrometer 110 and the retention time of LC.

First, a case where the solution is contaminated will be described with reference to FIG. 11A.

In the upper part of FIG. 11A, the temporal change of the impurity concentration is illustrated as a graph 500A. Furthermore, in the middle part, the signal intensity for each component is illustrated as a graph 500B. Then, in the lower part, X/X0 for each component is illustrated as a graph 500C. Here, X represents the signal intensity measured in step S401 in FIG. 9, and X0 represents the shigaraki intensity (signal intensity initial value) measured in step S301 in FIG. 8.

In the graph 500B, a signal intensity 501A indicates the signal intensity of the first component, and a signal intensity 501B indicates the signal intensity of the second component.

Furthermore, in the graph 500C, a signal intensity/signal intensity initial value 502A is the signal intensity/signal intensity initial value (X/X0) of the first component, and a signal intensity/signal intensity initial value 502B is the signal intensity/signal intensity initial value (X/X0) of the second component. The signal intensity initial value is the signal intensity measured in step S301 in FIG. 8. Note that in the graph 500C, XA is the signal intensity of the first component measured in step S401 of FIG. 9 (the same value as the signal intensity 501A). Furthermore, XB is the signal intensity of the second component measured in step S401 of FIG. 9 (the same value as that of reference sign 501B). Moreover, in the graph 500C, XA0 is the signal intensity of the first component measured in step S301 of FIG. 8 (signal intensity initial value). Then, XB0 is the signal intensity of the second component measured in step S301 of FIG. 8 (signal intensity initial value).

Here, the processing illustrated in FIG. 11A may be performed focusing on any one of the first flow path to the third flow path, but FIG. 11A is assumed to focus on the first flow path. That is, the graphs 500A to 500C illustrated in FIG. 11A relate to the first flow path.

Furthermore, the shape of the graph 500B of FIG. 11A is different from the shape of the graph 410A of FIG. 10B because the result illustrated in FIG. 11A illustrates an example different from that of FIG. 10B although satisfying the conditions W21*a* and W21*b*. Note that the times ta and tb will be described later. Furthermore, the signal intensity threshold TH11A of the first component and the signal intensity threshold TH11B of the second component are similar to those in FIG. 10B.

In a state where the solution is contaminated, impurities in the solution pass through the separation column 105 together with the standard sample. In particular, in a case where a gradient is applied to the mixing ratio of the solution, the impurity concentration changes depending on the retention time of the separation column 105 (graph 500A). Therefore, the influence of the ion suppression also changes depending on the retention time. This will be described in detail below. Incidentally, the impurity concentration can be determined by the measurement result of the mass spectrometer 110.

Assume that impurities are mixed in the second solution. Then, the second solution is gradually mixed with the first solution. In this case, as illustrated in the graph 500A of FIG. 11A, the impurity concentration increases with the retention time.

Then, as illustrated in the graph 500B, it is assumed that the signal intensity 501A related to the first component is measured at the time ta, and the signal intensity 501B related to the second component is measured at the time tb.

The second component measured at the time tb when the concentration of impurities is high is more affected by ion suppression due to impurities than the first component measured at the time ta when the concentration of impurities is low. Therefore, as illustrated in the graph 500B of FIG. 11A, the signal intensity 501B of the second component is much lower than the signal intensity 501A of the first component. That is, a decrease width of the signal intensity 501B of the second component with respect to the signal intensity threshold TH11B is larger than a decrease width of the signal intensity 501A of the first component with respect to the signal intensity threshold TH11A.

Moreover, the signal intensity 501B of the second component measured at the time tb at which the impurity concentration in the solution is high is much lower than the signal intensity 501A of the first component measured at the time ta at which the impurity concentration is low. Here, the decrease is a decrease in signal intensity of each component with respect to an initial value. Therefore, as illustrated in a graph 500C of FIG. 11A, XA/XA0>XB/XB0 is satisfied. Here, XA/XA0 corresponds to the signal intensity/signal intensity initial value 502A in FIG. 10B, and XB/XB0 corresponds to the signal intensity/signal intensity initial value 502B in FIG. 10B.

As described above, in a case where the impurity concentration is high at the retention time of the second component and the impurity concentration is low at the retention time of the first component, the signal intensity of the second component having a high ionization efficiency is greatly reduced with respect to the initial value of the signal intensity. As a result, XA/XA0>XB/XB0 is satisfied as illustrated in the graph 500C of FIG. 11A.

Note that in a case where the contamination relationship of the solution is opposite (in a case where the first solution is contaminated), a result opposite to the result illustrated in FIG. 11A is obtained. In this case, results similar to graphs 510B and 510C in FIG. 11B described later are obtained. Therefore, it is desirable to perform the measurement with the gradient of the solution reversed, that is, with the gradient pattern of the first solution→the second solution and the gradient pattern of the second solution→the first solution.

The measurement result detected in FIG. 11A can be considered as a case where the following conditions W32*a* and W32*b* are satisfied.

(Condition W32*a*) A decrease width of the signal intensity in the component having a high ionization efficiency is larger than a decrease width of the signal intensity in the component having a low ionization efficiency. Here, the decrease width is a decrease width of each component with respect to the signal intensity thresholds TH11A and TH11B. Hereinafter, the decrease width is a decrease width according to this definition.

(Condition W32*b*) The value of X/X0 in the component having a high ionization efficiency is lower than the value of X/X0 in the component having a low ionization efficiency.

As described above, in a case where the conditions W32*a* and W32*b* are satisfied, the determination processing unit 212 determines that the solution is contaminated.

The case where the condition W32*a* and the condition W32*b* are established corresponds to the case where the condition W32 in FIG. 9 is established. That is, a case where the state of FIG. 11A is detected corresponds to the processing of step S412: W32→step S414 in FIG. 9.

In this manner, the contamination of the solution can be easily detected by performing the determination based on the measurement results illustrated in FIGS. 10B and 11A.

Referring now to FIG. 11B.

In the upper part of FIG. 11B, the temporal change of the impurity concentration is illustrated as a graph 510A. Furthermore, in the middle part, the signal intensity for each component is illustrated as a graph 510B. Then, in the lower part, X/X0 for each component is illustrated as a graph 510C.

In the graph 510B, a signal intensity 511A indicates the signal intensity of the first component, and a signal intensity 511B indicates the signal intensity of the second component.

Furthermore, in the graph 510C, a signal intensity/signal intensity initial value 512A is the signal intensity/signal intensity initial value (X/X0) of the first component, and a signal intensity/signal intensity initial value 512B is the signal intensity/signal intensity initial value (X/X0) of the second component. Note that in the graph 510C, XA is the signal intensity of the first component measured in step S401 of FIG. 9 (the same value as the signal intensity 511A). Furthermore, XB is the signal intensity of the second component measured in step S401 of FIG. 9 (the same value as the signal intensity 511B). Moreover, in the graph 510C, XA0 is the signal intensity of the first component measured in step S301 of FIG. 8 (signal intensity initial value). Then, XB0 is the signal intensity of the second component measured in step S301 of FIG. 8 (signal intensity initial value).

Here, the processing illustrated in FIG. 11B may be performed focusing on any one of the first flow path to the third flow path, but FIG. 11B is assumed to focus on the first flow path. That is, the graphs 510A to 510C illustrated in FIG. 11B relate to the first flow path.

Furthermore, the shape of the graph 510B in FIG. 11B is different from the shape of the graph 410A in FIG. 10B, because the result illustrated in FIG. 11B illustrates an example different from that in FIG. 10B although satisfying the conditions W21*a* and W21*b*. Note that the times ta and tb will be described later. Furthermore, the signal intensity threshold TH11A of the first component and the signal intensity threshold TH11B of the second component are similar to those in FIG. 10B.

Note that, in the graph 510B of FIG. 11B, the signal intensity 511A indicates the signal intensity of the first component measured at time ta. Similarly, the signal intensity 511B indicates the signal intensity of the second component measured at the time tb.

In the contamination of the common part, contamination exists at the subsequent stage of the separation column 105. Therefore, dependency on the retention time due to impurities is small. Therefore, as illustrated in the graph 510A of FIG. 11B, impurities are eluted at a substantially constant concentration throughout the retention time. The common part is the selector valve 106, the pipe 126, the injector 103, and the capillary 112 of the mass spectrometer 110 as described above.

In such a state, impurities are uniformly contained in all the components, and thus the signal intensity is more strongly affected by ion suppression as the ionization efficiency of the component is lower. That is, a sample having a lower ionization efficiency is more strongly suppressed.

As described above, in the present embodiment, the first component has a lower ionization efficiency than the second component. Therefore, in a case where contamination occurs in the common part, the decrease width of the signal intensity 511A of the first component is larger than the decrease width of the signal intensity 511B of the second component as illustrated in the graph 510B of FIG. 11B. That is, the decrease in signal strength of the signal strength 511A of the first component is greater than that of the signal strength 511B of the second component.

When contamination occurs in the common part, the first component having a lower ionization efficiency causes ion suppression more strongly than the second component having a higher ionization efficiency as described above. Therefore, XA/XA0 that is X/X0 of the first component is smaller than the value of XB/XB0 that is X/X0 of the second component. That is, XB/XB>XA/XA0. XA/XA0 corresponds to the signal intensity/signal intensity initial value 512A in FIG. 11B, and XB/XB0 corresponds to the signal intensity/signal intensity initial value 512B in FIG. 11B.

Therefore, the measurement result illustrated in FIG. 11B is a state in which the following conditions W31*a* and W31*b* are satisfied.

(Condition W31*a*) A decrease width of the signal intensity in the component having a low ionization efficiency is larger than a decrease width of the signal intensity in the component having a high ionization efficiency.

(Condition W31*b*) X/X0 in the component having a low ionization efficiency is lower than X/X0 in the component having a high ionization efficiency.

As described above, in a case where the following conditions W31*a* and W31*b* are satisfied, the determination processing unit 212 determines that contamination of the common part has occurred.

However, even in a case where contamination occurs in all the solutions (both the first solution and the second solution in the example of FIG. 11B), the state of FIG. 11B, that is, the condition W31*a* and the condition W31*b* are established. Therefore, in a case where the condition W31*a* and the condition W31*b* are satisfied, contamination of the solution may be considered in addition to contamination of the common part. However, since the probability that all the solutions are contaminated at the same time is low, when the condition W31*a* and the condition W31*b* are satisfied, it can be identified as contamination of the common part by performing the present contamination determination at a high frequency.

Note that a case where the condition W31*a* and the condition W31*b* are established corresponds to a case where the condition W31 in FIG. 9 is established. Therefore, in a case where the state of FIG. 11B is detected, it corresponds to step S412: W31→step S413 of FIG. 9.

As described above, the determination is made based on the measurement results illustrated in FIGS. 10B and 11B, so that the contamination of the common part can be easily detected.

Next, the state of FIG. 10C will be described.

In FIG. 10C, the upper part (graphs 420A to 420C) illustrates the signal intensity of each of the first component and the second component in each flow path. Note that in FIG. 10C, a graph 420A illustrates the measurement result in the first flow path, a graph 420B illustrates the measurement result in the second flow path, and a graph 420C illustrates the measurement result in the third flow path. Furthermore, in the graph 420A, a signal intensity 421A is the signal intensity related to the first component, and a signal intensity 421B is the signal intensity related to the second component. Similarly, in the graph 420B, a signal intensity 422A is the signal intensity related to the first component, and a signal intensity 422B is the signal intensity related to the second component. Moreover, in the graph 420C, a signal intensity 423A is the signal intensity related to the first component, and a signal intensity 423B is the signal intensity related to the second component.

In the lower stage (a graph 420D) of FIG. 10C, a signal intensity ratio 424A indicates the signal intensity ratio in the first flow path, a signal intensity ratio 424B indicates the signal intensity ratio in the second flow path, and a signal intensity ratio 424C indicates the signal intensity ratio in the third flow path.

Moreover, as illustrated in the graph 420D, the upper limit TH12U and the lower limit TH12L of the signal intensity ratio threshold TH12 are set. Moreover, a signal intensity ratio threshold range TH12R is set as a range of the upper limit TH12U and the lower limit TH12L of the signal intensity ratio threshold TH12.

Furthermore, in the graph 420D of FIG. 10C, a signal intensity ratio R indicates the signal intensity ratio in a case where there is no contamination. The signal intensity ratio R in the absence of contamination is measured in advance (step S301 in FIG. 8). As described above, the upper limit TH12U and the lower limit TH12L of the signal intensity ratio threshold TH12 are set based on the signal intensity ratio R. Note that the case where there is no contamination is described in step S301 of FIG. 8.

Furthermore, in FIG. 10C, the signal intensity threshold TH11A of the first component, the signal intensity threshold TH11B of the second component, the upper limit TH12U of the signal intensity ratio threshold TH12, and the lower limit TH12L are values similar to those in FIGS. 10A and 10B.

In the example illustrated in FIG. 10C, the following conditions W41 and W11N are satisfied.

(Condition W41) As illustrated in the graphs 420A to 420C of FIG. 10C, the signal intensities 421A to 423A and 421B to 423B decrease in all the flow paths, and are less than or equal to the signal intensity threshold TH11. Specifically, all of the signal intensities 421A to 423A of the first component are lower than the signal intensity threshold TH11A of the first component. Moreover, all of the signal intensities 421B to 423B of the second component are lower than the signal intensity threshold TH11B of the second component. The condition W41 is similar to the condition W41 in FIG. 9 (step S421 in FIG. 9: Yes).

(Condition W11N) In all the flow paths, the signal intensity ratios 424A to 424C are less than the upper limit TH12U of the signal intensity ratio threshold TH12 and larger than the lower limit TH12L. In other words, the signal intensity ratios 424A to 424C are within the signal intensity ratio threshold range TH12R in all the flow paths. The condition W11N is a case where the condition W11 in FIG. 9 is not established (step S402 in FIG. 9: No).

The condition W41 and the condition W11N are both caused by contamination or deterioration of an electrode of the ion source 111 inside the mass spectrometer 110 that is not affected by the ionization efficiency. Therefore, in a case where both the condition W41 and the condition W11N are satisfied, the determination processing unit 212 determines that contamination or deterioration has occurred in the mass spectrometer 110 (specifically, the ion source 111).

Note that as described above, the establishment of the condition W41 is equivalent to the establishment of the condition W41 in FIG. 9. Furthermore, the establishment of condition W11N is equivalent to the establishment of "No" in condition W11 in FIG. 9. That is, detection of the state in FIG. 10C is equivalent to execution of the processing of step S402: No→step S421: Yes→step S422 in FIG. 9.

As described above, the contamination of the mass spectrometer 110 (particularly, the ion source 111) can be easily detected by performing the determination based on the measurement result illustrated in FIG. 10C.

Summary

FIG. 12 summarizes the contamination determination in the third embodiment. Note that, in FIG. 12, "W11", "W21", "W22", "W31", "W32", and "W41" correspond to the conditions W11, W21, W22, W31, W32, and W41 in FIG. 9.

First, the following conditions may be established.

The signal intensity ratio is out of the signal intensity ratio threshold range (out of the signal intensity ratio threshold range TH12R) in any one of the flow paths (condition W11 in FIG. 9: Yes).

The signal intensity is lower than the signal intensity threshold TH11 in all the flow paths, and the signal intensity ratio is out of the signal intensity ratio threshold range in all the flow paths (out of the signal intensity ratio threshold range TH12R: in a case where the condition W21 in FIG. 9 is established).

The decrease width of the signal intensity (X) in the component having a low ionization efficiency is larger than that in the component having a high ionization efficiency, and X/X0 in the component having a low ionization efficiency is lower than that in the component having a high ionization efficiency (in a case where the condition W31 in FIG. 9 is established). Note that X and X0 in FIG. 12 are similar to X and X0 in FIGS. 9, 11A, and 11B.

A case where such a condition is established corresponds to a case where the states of FIGS. 10B and 11B are detected. Therefore, the determination processing unit 212 determines that contamination of the common part or contamination of the solution occurs. However, as described above, the possibility of occurrence of contamination of the solution can be reduced by increasing the frequency of performing the determination of the contaminated site, and thus it is indicated as "Δ" in FIG. 12.

Next, the following conditions may be established.

The signal intensity ratio is out of the signal intensity ratio threshold range (out of the signal intensity ratio threshold range TH12R) in any one of the flow paths (condition W11 in FIG. 9: Yes).

The signal intensity is lower than the signal intensity threshold TH11 in all the flow paths, and the signal intensity ratio is out of the signal intensity ratio threshold range in all the flow paths (out of the signal intensity ratio threshold range TH12R: in a case where the condition W21 in FIG. 9 is established).

The decrease width of the signal intensity (X) in the component having a high ionization efficiency is larger than that in the component having a low ionization efficiency, and X/X0 in the component having a high ionization efficiency is lower than that in the component having a low ionization efficiency (in a case where the condition W32 in FIG. 9 is established).

A case where such a condition is established corresponds to a case where the states of FIGS. 10B and 11A are detected. Therefore, the determination processing unit 212 determines that the solution is contaminated.

Next, the following conditions may be established.

The signal intensity ratio is out of the signal intensity ratio threshold range (out of the signal intensity ratio threshold range TH12R) in any one of the flow paths (condition W11 in FIG. 9: Yes).

In the specific flow path, the signal intensity of the flow path is lower than that of the other flow paths, and the signal intensity ratio of the flow path is outside the signal intensity ratio threshold range (outside the signal intensity ratio threshold range TH12R) (when the condition W22 in FIG. 9 is established).

A case where such a condition is established corresponds to a case where the state of FIG. 10A is detected. Therefore, the determination processing unit 212 determines that contamination has occurred in the flow path (specific flow path) satisfying the above condition.

Subsequently, the following conditions may be established.

The signal intensity ratio is within the signal intensity ratio threshold range (within the signal intensity ratio threshold range TH12R) in all the flow paths (condition W11 in FIG. 9: No).

The signal intensity is lower than the signal intensity threshold TH11 in all the flow paths (condition W41 in FIG. 9: Yes).

A case where such a condition is established corresponds to a case where the state of FIG. 10C is detected. Therefore, the determination processing unit 212 determines that contamination or deterioration of the mass spectrometer 110 (specifically, the ion source 111) has occurred.

Note that a state in which a state in which "the signal intensity is lower than the signal intensity threshold TH11 in the specific flow path" is not detected in a state in which it is determined that "the signal intensity ratio is within the signal intensity ratio threshold range in all the flow paths" (In FIG. 12, hatched lines are illustrated). In the process of FIG. 9, in a case where the condition that "the signal intensity is lower than the signal intensity threshold TH11 in all the flow paths" (S421) is determined to be "No" in the state (S402: No) in which "the signal intensity ratio is within the signal intensity ratio threshold range in all the flow paths", the determination processing unit 212 determines that there is no anomaly.

The signal intensity fluctuates due to the ionization state in the ion source 111, the pulsation of the liquid feeding pump 102, and the like other than the influence of contamination. Therefore, as in the first embodiment, in a case where the contaminated site is determined only by the value (absolute value) of the signal intensity, it is necessary to set the threshold TH1 (see FIGS. 5A and 5B) low to lower the sensitivity of the determination, thereby preventing erroneous determination. That is, in identifying the contaminated site by the value (absolute value) of the signal intensity, it is necessary to set the threshold TH1 low in consideration of the ionization state in the ion source 111, fluctuation due to the pulsation of the liquid feeding pump 102, and the like.

In the second embodiment, by referring to the change in the signal intensity ratio in addition to the signal intensity, it is possible to determine the contamination without being affected by the variation (fluctuation) in the signal intensity due to factors other than the contamination. Therefore, as compared with the first embodiment, even if the threshold (signal intensity threshold TH11) is set high in the contamination determination on the value (absolute value) of the signal intensity, the probability of erroneous determination can be reduced, and high sensitivity determination can be performed.

Furthermore, in the second embodiment, it is possible to identify a contaminated site finer than that in the first embodiment, such as separation of a contamination state between solution contamination and a common portion. As a result, the accuracy of anomaly determination can be improved. Note that the number of components included in the mixed sample may be two or more, and the determination can be similarly performed even if the number is three or more. In that case, it is sufficient to obtain a signal intensity ratio using any two specific components.

Third Embodiment

Figure 13A:
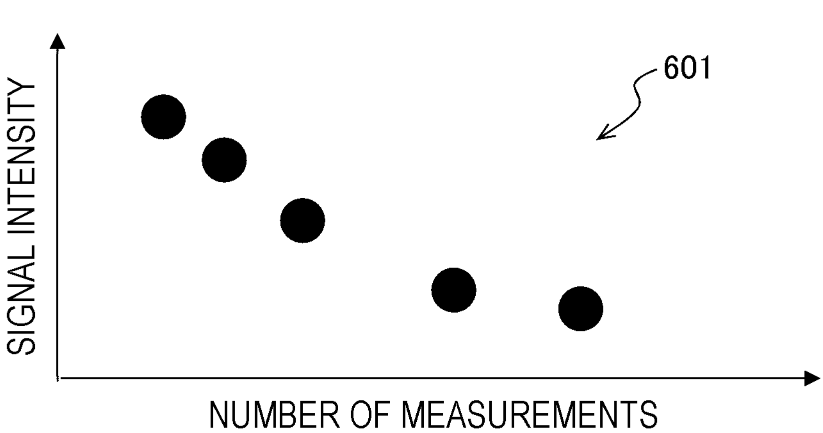
FIG. 13A is a diagram (part 1) illustrating a method of identifying a cause of contamination in the third embodiment.
Figure 13B:
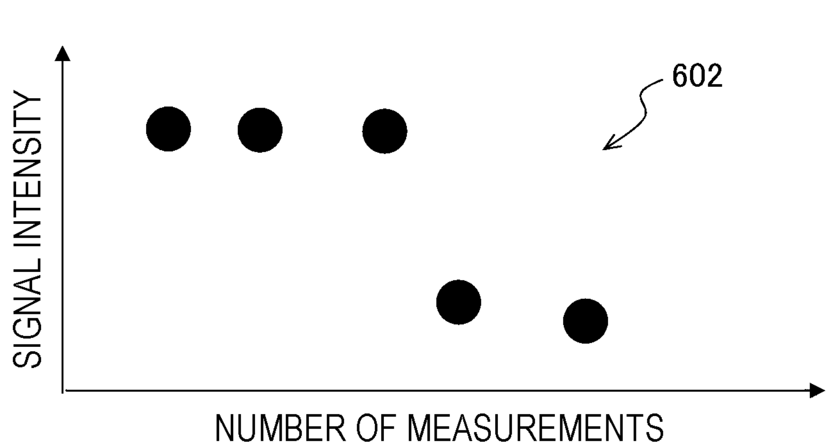
FIG. 13B is a diagram (part 2) illustrating the method of identifying the cause of contamination in the third embodiment.

FIGS. 13A and 13B are diagrams illustrating a method of identifying a cause of contamination in a third embodiment.

In FIGS. 13A and 13B, time-series data of the signal intensity at the time of measuring the contaminated site of the flow path is held in the storage device 202, and the determination processing unit 212 compares the signal intensity along the time series. For example, in a case where the signal intensity gradually (continuously) decreases as in time series 601 of the signal intensity illustrated in FIG. 13A, accumulation of contamination in the pipes 121*a*, 121*b*, 122*a*, 122*b*, 123, and 125 and deterioration of consumable components such as the capillary 112 are considered. On the other hand, in a case where the signal intensity decreases discontinuously (discontinuously) as in time series 602 of the signal intensity illustrated in FIG. 13B, it is suspected that there is a possibility that dust or the like (a foreign substance) is mixed in the solution or the standard sample or contamination associated with the replacement work is caused. When the determination in FIGS. 13A and 13B is combined with information such as the separation column 105, the capillary 112, and a cleaning history of the solution replacement, the accuracy of the contaminated site identification can be further improved.

According to the third embodiment, it is possible to determine a contaminated site with higher accuracy as compared with a case where the determination is made by one measurement.

When a contaminated site is identified by the methods described in the first to third embodiments, contamination can be removed by a recovery operation such as cleaning of the identified contaminated site or replacement of parts. After the recovery operation, the contaminated site identification process illustrated in FIG. 4 is performed again. When the signal intensity is greater than or equal to the threshold TH1 in all the flow paths, the user determines that the contamination is removed. In such a state, normal measurement can be performed. Incidentally, the normal measurement is not a measurement for identifying a contaminated site as illustrated in FIG. 3, FIG. 4, FIG. 8, or FIG. 9 but a measurement of an arbitrary sample.

Furthermore, in a case where the contaminated site is a specific flow path, the capillary 112 of the ion source 111, or the separation column 105, cleaning is performed by feeding a cleaning solution to the contaminated site. The solution suitable for cleaning varies depending on the type of contamination, and pure water is suitable for removing inorganic substances such as salts. Furthermore, an organic solution such as isopropanol is suitable for removing a polymer substance. In a case where the signal intensity is not recovered by washing, consumables such as the separation column 105 and the capillary 112 of the ion source 111 are replaced.

In the first to third embodiments, the identification of the contaminated site may be notified by an alarm or the like. Furthermore, the contaminated site may be cleaned by automatic cleaning.

The present invention is not limited to the above-described embodiments, and includes various modifications. For example, the above-described embodiments have been described in detail for easy understanding of the present invention, and are not necessarily limited to those having all the described configurations. Furthermore, a part of the configuration of one embodiment can be replaced with the configuration of another embodiment, and the configuration of another embodiment can be added to the configuration of one embodiment. Furthermore, it is possible to add, delete, and replace other configurations for a part of the configuration of each embodiment.

Furthermore, some or all of the above-described configurations, functions, units 211 to 213, storage devices 202 and 202*a*, and the like may be realized by hardware, for example, by designing with an integrated circuit. Furthermore, as illustrated in FIGS. 2 and 7, each of the above-described configurations, functions, and the like may be realized by software by a processor such as the CPU 201 interpreting and executing a program for realizing each function. Information such as a program, a table, and a file for realizing each function can be stored in the memory 210, a recording device such as an SSD, or a recording medium such as an integrated circuit (IC) card, a secure digital (SD) card, or a digital versatile disc (DVD) in addition to an HD.

Furthermore, in each embodiment, control lines and information lines considered to be necessary for description are illustrated, and not all control lines and information lines in a product are necessarily illustrated. In practice, it may be considered that almost all the configurations are connected to each other.

REFERENCE SIGNS LIST

- 1 LC/MS (liquid chromatograph mass spectrometer)
- 2, 2*a* processing device
- 101, 101*a*, 101*b* solution tank (solution is stored)
- 102 liquid feeding pump (liquid chromatography)
- 103 injector (liquid chromatography)
- 104 injection valve (liquid chromatography)
- 105, 105*a* to 105*c* separation column (liquid chromatography)
- 106 selector valve (liquid chromatography, common part in each flow path)
- 110 mass spectrometer
- 111 ion source
- 112 capillary (common part in each flow path)
- 121*a*, 121*b* pipe (liquid chromatography)
- 122*a*, 122*b* pipe (liquid chromatography, a plurality of flow paths, solution flows, component constituting flow path)
- 123, 123*a* to 123*c* pipe (liquid chromatography, a plurality of flow paths, solution flows, component constituting flow path)
- 124 sample loop (liquid chromatography, flow of predetermined substance, mixed sample flows, component constituting flow path)
- 125, 125*a* to 125*c* pipe (liquid chromatography, a plurality of flow paths, solution and mixed sample flow, component constituting flow path)
- 126 pipe (liquid chromatography, flow path connected to mass spectrometer, common part in each flow path)
- 205 output device (output unit)
- 301 to 303, 311 to 313, 401A to 403A, 401B to 403B, 411A to 413A, 411B to 413B, 421A to 423A, 421B to 423B, 501A, 501B, 511A, 511B signal intensity
- 404A to 404C, 414A to 414C, 424A to 424C signal intensity ratio
- 502A, 502B, 512A, 512B signal intensity/signal intensity initial value (ratio of signal intensity to pre-measured signal intensity)
- 601, 602 time series
- R signal intensity ratio
- S101, S301 measurement of standard sample in uncontaminated state (pre-measurement, pre-measured signal intensity is obtained)
- TH1 threshold
- TH11, TH11A, TH11B signal intensity threshold
- TH12 signal intensity ratio threshold
- TH12U upper limit
- TH12L lower limit
- TH12R signal intensity ratio threshold range
- Z LC/MS system (mass spectrometry system)

The invention claimed is:

1. A mass spectrometry system comprising:

a liquid chromatography including a plurality of flow paths;

a mass spectrometer; and a processing device configured to acquire a signal intensity that is a measurement result of a substance from the mass spectrometer, wherein each of the plurality of flow paths is provided with a separation column and the plurality of flow paths is installed so as to be parallel to each other, the processing device is configured to control a selector valve to select a flow path connected to the mass spectrometer from the plurality of flow paths, the processing device is configured to cause a predetermined substance to flow together with a solution in each of the plurality of flow paths, and the mass spectrometer is configured to measure the predetermined substance, and the processing device is configured to determine anomaly of the liquid chromatography and the mass spectrometer based on the signal intensity obtained as a result of measurement of the predetermined substance by the mass spectrometer for each of the plurality of flow paths, and is configured to output a result of determination to an output unit, the predetermined substance is a mixed sample including a plurality of components having different ionization efficiencies, and the processing device is configured to calculate a signal intensity ratio for each of the flow paths, the signal intensity ratio being a ratio of signal intensities of the mixed sample, and is configured to determine an anomaly of the liquid chromatography and the mass spectrometer based on the signal intensity and the signal intensity ratio in each of the flow paths.

2. The mass spectrometry system according to claim 1, wherein the processing device is configured to cause the predetermined substance to flow into each of the plurality of flow paths in a state where no contamination occurs in the liquid chromatography and the mass spectrometer to perform pre-measurement by the mass spectrometer, and a threshold of the signal intensity is preset for each of the flow paths based on a pre-measured signal intensity obtained as a result of the pre-measurement, and the processing device is configured to determine anomaly of the liquid chromatography and the mass spectrometer by comparing the signal intensity acquired from measurement performed after the pre-measurement with the threshold.

3. The mass spectrometry system according to claim 2, wherein in a case where the signal intensity is lower than the threshold in a predetermined flow path among the plurality of flow paths, and the signal intensity is higher than the threshold in other flow paths, the processing device is configured to determine that contamination occurs in a component constituting the flow path in which the signal intensity is lower than the threshold.

4. The mass spectrometry system according to claim 2, wherein in a case where the signal intensity is lower than the threshold in all of the plurality of flow paths, the processing device is configured to determine that contamination occurs in any one of a common part in each flow path among the plurality of flow paths, the solution, and an ion source provided in the mass spectrometer.

5. The mass spectrometry system according to claim 1, wherein the processing device is configured to perform pre-measurement on the mixed sample having a known component concentration in a state where each unit constituting the liquid chromatography and the mass spectrometer is not contaminated, the processing device includes a storage device storing a signal intensity threshold that is a threshold of the signal intensity and that is set for each of the components based on a pre-measured signal intensity obtained as a result of the pre-measurement, the processing device is configured to set a signal intensity ratio threshold range based on the pre-measured signal intensity obtained as a result of the pre-measurement, the signal intensity ratio threshold range being a range in which a threshold of the signal intensity ratio can be set, after the pre-measurement, the processing device is configured to make a measurement on the mixed sample, and the processing device is configured to compare a plurality of signal intensities acquired as a result of the measurement with the signal intensity threshold, and is configured to compare the signal intensity ratio calculated from the plurality of signal intensities acquired as a result of the measurement with the signal intensity ratio threshold range to detect anomaly in the liquid chromatography and the mass spectrometer.

6. The mass spectrometry system according to claim 5, wherein in a case where, in a specific flow path, the signal intensity for all components is lower than the signal intensity threshold and the signal intensity ratio is outside the signal intensity ratio threshold range, the processing device is configured to determine that contamination occurs in any of a component constituting the flow path.

7. The mass spectrometry system according to claim 5, wherein in a case where the signal intensity for all components is lower than the signal intensity threshold in all the flow paths and the signal intensity ratio is within a signal intensity ratio threshold range in all the flow paths, the processing device is configured to determine that at least one of contamination of and deterioration of the mass spectrometer occurs.

8. The mass spectrometry system according to claim 5, wherein in a case where the signal intensity for all components is lower than the signal intensity threshold in all the flow paths and the signal intensity ratio is outside a signal intensity ratio threshold range in all the flow paths, and further in a case where a component included in the mixed sample and having a high ionization efficiency among the components having different ionization efficiencies has a decrease width of the signal intensity with respect to the signal intensity threshold which is larger than a decrease width of the component having a low ionization efficiency, and a ratio between the signal intensity of the component having a high ionization efficiency and the pre-measured signal intensity is lower than a ratio between the signal intensity of the component having a low ionization efficiency and the pre-measured signal intensity, the processing device is configured to determine that contamination of the solution occurs.

9. The mass spectrometry system according to claim 5, wherein in a case where the signal intensity for all components is lower than the signal intensity threshold in all the flow paths and the signal intensity ratio is outside a signal intensity ratio threshold range in all the flow paths, and further in a case where a component included in the mixed sample and having a low ionization efficiency among the components having different ionization efficiencies has a decrease width of the signal intensity with respect to the signal intensity threshold which is larger than a decrease width of the component having a high ionization efficiency, and a ratio between the signal intensity of the component having a low ionization efficiency and the pre-measured signal intensity is lower than a ratio between the signal intensity of the component having a high ionization efficiency and the pre-measured signal intensity, the processing device is configured to determine that contamination occurs at least at a common part in each of the flow paths.

10. The mass spectrometry system according to claim 1, wherein in a case where the signal intensity decreases discontinuously on a time-series basis, the processing device is configured to determine that at least one of mixing of a foreign substance and contamination associated with replacement work of the liquid chromatography and the mass spectrometer occurs.

11. The mass spectrometry system according to claim 1, wherein in a case where the signal intensity decreases continuously on a time-series basis, the processing device is configured to determine that at least one of accumulation of contamination in a pipe constituting the liquid chromatography and deterioration of a component constituting the mass spectrometer occurs.

12. A processing device configured to acquire a signal intensity that is a measurement result of a substance from a mass spectrometer of a liquid chromatograph mass spectrometer including a liquid chromatography including a plurality of flow paths and the mass spectrometer, wherein each of the plurality of flow paths is provided with a separation column and the plurality of flow paths is installed so as to be parallel to each other, the processing device is configured to control a selector valve to select a flow path connected to the mass spectrometer from the plurality of flow paths, the processing device is configured to cause a predetermined substance to flow together with a solution in each of the plurality of flow paths, and the mass spectrometer is configured to measure the predetermined substance, the processing device is configured to determine anomaly of the liquid chromatography and the mass spectrometer based on the signal intensity obtained as a result of measurement of the predetermined substance by the mass spectrometer for each of the plurality of flow paths, and is configured to output a result of determination to an output unit, the predetermined substance is a mixed sample including a plurality of components having different ionization efficiencies, and the processing device is configured to calculate a signal intensity ratio for each of the flow paths, the signal intensity ratio being a ratio of signal intensities of the mixed sample, and is configured to determine an anomaly of the liquid chromatography and the mass spectrometer based on the signal intensity and the signal intensity ratio in each of the flow paths.

13. An anomaly detection method in a mass spectrometry system including a liquid chromatography including a plurality of flow paths, a mass spectrometer, and a processing device configured to acquire a signal intensity that is a measurement result of a substance from the mass spectrometer, wherein each of the plurality of flow paths is provided with a separation column and the plurality of flow paths is installed so as to be parallel to each other, the method comprising the steps of:

controlling, by the processing device, a selector valve to select a flow path connected to the mass spectrometer is selected from the plurality of flow paths, causing, by the processing device, a predetermined substance to flow together with a solution in each of the plurality of flow paths, and measuring, by the mass spectrometer, the predetermined substance, and determining, by the processing device, an anomaly of the liquid chromatography and the mass spectrometer based on the signal intensity obtained as a result of measurement of the predetermined substance by the mass spectrometer for each of the plurality of flow paths, and outputting, by the processing device, a result of determination to an output unit, wherein the predetermined substance is a mixed sample including a plurality of components having different ionization efficiencies, and wherein the method further comprises:

calculating, by the processing device, a signal intensity ratio for each of the flow paths, the signal intensity ratio being a ratio of signal intensities of the mixed sample, and determining an anomaly of the liquid chromatography and the mass spectrometer based on the signal intensity and the signal intensity ratio in each of the flow paths.

* * * * *